US012725076B2

(12) United States Patent
Suneja et al.

(10) Patent No.: US 12,725,076 B2
(45) Date of Patent: Sep. 1, 2026

(54) ARTIFICIAL INTELLIGENCE MODEL LEARNING INTROSPECTION

(71) Applicant: International Business Machines Corporation, Armonk, NY (US)

(72) Inventors: Sahil Suneja, Ossining, NY (US); Yufan Zhuang, New York, NY (US); Yunhui Zheng, Chappaqua, NY (US); Alessandro Morari, New York, NY (US); Jim Alain Laredo, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1055 days.

(21) Appl. No.: 17/506,753

(22) Filed: Oct. 21, 2021

(65) Prior Publication Data

US 2023/0130781 A1 Apr. 27, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 6,393,386 | B1 | 5/2002 | Zager et al. | |
| 10,540,257 | B2 | 1/2020 | Tezuka et al. | |
| 10,949,338 | B1 * | 3/2021 | Sirianni | G06N 20/10 |
| 11,455,493 | B2 | 9/2022 | Hind et al. | |

(Continued)

FOREIGN PATENT DOCUMENTS

| | | |
|---|---|---|
| CN | 106294174 A | 1/2017 |
| CN | 110135592 A | 8/2019 |

(Continued)

OTHER PUBLICATIONS

Zhang, H., Zhang, X., & Gu, M. (Dec. 2007). Predicting defective software components from code complexity measures. In 13th Pacific Rim International Symposium on Dependable Computing (PRDC 2007) (pp. 93-96). IEEE. (Year: 2007).*

(Continued)

*Primary Examiner* — Michael J Huntley
*Assistant Examiner* — Maggie Thanh Maido
(74) *Attorney, Agent, or Firm* — Amin, Turocy & Watson, LLP

(57) ABSTRACT

Techniques regarding AI model introspection are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise model introspection component that can analyze artificial intelligence model learning behavior for a code understanding task by comparing an output of an artificial intelligence model with respect to a plurality of testing data subsets that have varying code complexity distributions.

20 Claims, 12 Drawing Sheets

(56) References Cited

U.S. PATENT DOCUMENTS

| | | | |
|---|---|---|---|
| 2015/0135166 A1* | 5/2015 | Tarlow | G06F 11/3604 717/124 |
| 2016/0358099 A1 | 12/2016 | Sturlaugson et al. | |
| 2019/0057014 A1* | 2/2019 | Shalev | G06F 11/368 |
| 2019/0317885 A1* | 10/2019 | Heinecke | G06F 11/3616 |
| 2019/0324744 A1* | 10/2019 | Alam | G06F 8/31 |
| 2020/0034665 A1 | 1/2020 | Ghanta et al. | |
| 2020/0311557 A1 | 10/2020 | Jin et al. | |
| 2021/0004671 A1 | 1/2021 | Brill et al. | |

FOREIGN PATENT DOCUMENTS

| | | | |
|---|---|---|---|
| CN | 110378463 | A | 10/2019 |
| CN | 111338972 | A | 6/2020 |
| CN | 112189204 | A | 1/2021 |
| CN | 118159943 | A | 6/2024 |
| EP | 3 805 933 | A1 | 4/2021 |
| GB | 2627379 | A | 8/2024 |
| JP | 2018-156654 | A | 10/2018 |
| JP | 2024-538950 | A | 10/2024 |
| WO | 2021051917 | A1 | 3/2021 |
| WO | 2021069149 | A1 | 4/2021 |
| WO | 2023/066237 | A1 | 4/2023 |

OTHER PUBLICATIONS

Bhandari, G. P., & Gupta, R. (Nov. 2018). Measuring the fault predictability of software using deep learning techniques with software metrics. In 2018 5th IEEE Uttar Pradesh Section International Conference on Electrical, Electronics and Computer Engineering (UPCON) (pp. 1-6). IEEE. (Year: 2018).*

Le, T. H., Chen, H., & Babar, M. A. (Jun. 2020). Deep learning for source code modeling and generation: Models, applications, and challenges. ACM Computing Surveys (CSUR), 53(3), 1-38. (Year: 2020).*

Sharma, T., Kechagia, M., Georgiou, S., Tiwari, R., Vats, I., Moazen, H., & Sarro, F. (Oct. 18, 2021). A survey on machine learning techniques for source code analysis. arXiv preprint arXiv:2110.09610. (Year: 2021).*

Dabkowski, P., & Gal, Y. (Dec. 2017). Real time image saliency for black box classifiers. Advances in neural information processing systems, 30. (Year: 2017).*

Warnecke, A., Arp, D., Wressnegger, C., & Rieck, K. (Jun. 2019). Don't paint it black: White-box explanations for deep learning in computer security. CoRR. (Year: 2019).*

Baniecki, H., Kretowicz, W., PiÄ, P., & Wil, J. (Oct. 2021. dalex: Responsible machine learning with interactive explainability and fairness in python. Journal of Machine Learning Research, 22(214), 1-7. (Year: 2021).*

"Juliet Test Suite for C/C++ Version 1.3", URL: https://doi.org/10.6028/NIST.TN.1995, NIST, 2017, 36 pages.

Panthaplackel et al., "Learning to Update Natural Language Comments Based on Code Changes", Proceedings of the 58th Annual Meeting of the Association for Computational Linguistics, Jul. 5-10, 2020, 16 pages.

Pascarella et al., "On the performance of method-level bug prediction: A negative result", The Journal of Systems & Software, vol. 161, 2020, 22 pages.

Patra et al., "Semantic Bug Seeding: A Learning Based Approach for Creating Realistic Bugs", ESEC/FSE, Association for Computing Machinery, Aug. 23-28, 2021, pp. 906-918.

Pradel et al., "DeepBugs: A Learning Approach to Name-Based Bug Detection", Proceedings of the ACM on Programming Languages, 2(OOPSLA), Article 147, Nov. 2018, pp. 1-25.

Rabin et al., "Understanding Neural Code Intelligence through Program Simplification", Proceedings of the 29th ACM Joint Meeting on European Software Engineering Conference and Symposium on the Foundations of Software Engineering , ESEC/FSE, Aug. 23-28, 2021, 12 pages.

Ribeiro et al., ""Why should I trust you?" Explaining the Predictions of any Classifier", Proceedings of the 22nd ACM SIGKDD International Conference on Knowledge Discovery and Data Mining, 2016, 10 pages.

Roy et al., "Bug Synthesis: Challenging Bug-Finding Tools with Deep Faults", Proceedings of the 26th ACM Joint Meeting on European Software Engineering Conference and Symposium on the Foundations of Software Engineering , ESEC/FSE, Nov. 4-9, 2018, pp. 224-234.

Russell et al., "Automated Vulnerability Detection in Source Code Using Deep Representation Learning", 17th IEEE International Conference on Machine Learning and Applications, 2018, 7 pages.

Selvaraju et al., "Grad-Cam: Visual Explanations from Deep Networks via Gradient-Based Localization", Proceedings of the IEEE international conference on computer vision, 2017, 24 pages.

Sestili et al., "Towards security defect prediction with AI", URL: https://arxiv.org/pdf/1808.09897.pdf, 2018, 11 pages.

Shorten et al., "A survey on image data augmentation for deep learning", Journal of Big Data, vol. 6, No. 60, 2019, pp. 1-48.

Shrikumar et al., "Learning Important Features Through Propagating Activation Differences", Proceedings of the 34th International Conference on Machine Learning, 2017, 9 pages.

Sundararajan et al., "Axiomatic Attribution for Deep Networks", Proceedings of the 34th International Conference on Machine Learning, 2017, 11 pages.

Suneja et al., "Learning to map source code to software vulnerability using code-as-a-graph", URL: https://arxiv.org/ftp/arxiv/papers/2006/2006.08614.pdf, 2020, pp. 1-8.

Suneja et al., "Probing Model Signal-Awareness via Prediction-Preserving Input Minimization", Proceedings of the 29th ACM Joint Meeting on European Software Engineering Conference and Symposium on the Foundations of Software Engineering, ESEC/FSE, 2021, pp. 945-955.

Mckay, Peter, "Accelerating our developer-first vision with DeepCode", URL: https://snyk.io/blog/accelerating-developer-first-vision-with-deepcode/, Snyk Team, Sep. 23, 2020, pp. 1-5.

Tufano et al., "On Learning Meaningful Code Changes via Neural Machine Translation", Proceedings of the 41st International Conference on Software Engineering, IEEE/ACM, May 25-31, 2019, pp. 25-36.

Tufano et al., "An Empirical Study on Learning Bug-Fixing Patches in the Wild via Neural Machine Translation", ACM Transactions on Software Engineering and Methodology, vol. 28, No. 4, Article 19, Sep. 2019, pp. 1-29.

Tufano et al., "Learning How to Mutate Source Code from Bug-Fixes", International Conference on Software Maintenance and Evolution, IEEE, Sep. 29-Oct. 4, 2019, 12 pages.

Velićković et al., "Graph Attention Networks", International Conference on Learning Representations, 2018, pp. 1-12.

Xie et al., "Crystal Graph Convolutional Neural Networks for an Accurate and Interpretable Prediction of Material Properties", Physical Review Letters, vol. 120, No. 14, 2018, pp. 1-9.

Yamaguchi et al., "Modeling and Discovering Vulnerabilities with Code Property Graphs", IEEE Symposium on Security and Privacy, 2014, 15 pages.

Yang et al., "A Survey on Deep Learning for Software Engineering", ACM Comput. Surv., vol. 1, No. 1, Article 1, Jan. 2020, pp. 1-35.

Ying et al., "GNNExplainer: Generating Explanations for Graph Neural Networks", 33rd Conference on Neural Information Processing Systems, 2019, pp. 1-13.

Yu et al., "Seqgan: Sequence Generative Adversarial Nets with Policy Gradient", Proceedings of the AAAI Conference on Artificial Intelligence, vol. 31, 2017, 11 pages.

Zeller, Andreas, "Isolating Cause-Effect Chains from Computer Programs", Proceedings of the 10th ACM SIGSOFT Symposium on Foundations of Software Engineering, SIGSOFT '02/FSE-10, Nov. 18-22, 2002, pp. 1-10.

Zeller et al., "Simplifying and Isolating Failure Inducing Input", IEEE Transactions on Software Engineering, vol. 28, No. 2, Feb. 2002, pp. 1-17.

(56) References Cited

OTHER PUBLICATIONS

Zhang et al., "Towards Stable and Efficient Training of Verifiably Robust Neural Networks", International Conference on Learning Representations, 2019, pp. 1-25.
Zhao et al., "On the Impact of Sample Duplication in Machine Learning-Based Android Malware Detection", ACM Transactions on Software Engineering and Methodology, vol. 30, No. 3, Article 40, May 2021, pp. 1-38.
Zheng et al., "D2A: A Dataset Built for Al-Based Vulnerability Detection Methods Using Differential Analysis", Proceedings of the ACM/IEEE 43rd International Conference on Software Engineering: Software Engineering in Practice, 2021, 10 pages.
Madry, et al., "Towards Deep Learning Models Resistant to Adversarial Attacks," 2018 In International Conference on Learning Representation, 2018.
Snyk Team. Accelerating our developer-first vision with DeepCode. https://snyk.io/blog/accelerating-developer-first-vision-with-deepcode/. Sep. 23, 2020.
Zhou, et al., Devign: Effective Vulnerability Identification by Learning Comprehensive Program Semantics via Graph Neural Networks. In Advances in Neural Information Process, arXiv:1909.03496v1 [cs.SE] Sep. 8, 2019.
Zhou, et al., "Learning Deep Features for Discriminative Localization," 2016 IEEE Conference on Computer Vision and Pattern Recognition (CVPR), 9 pages.
Ribeiro, et al., ""Why Should I Trust You?" Explaining the Predictions of Any Classifier," arXiv: 1602.04938v3 [cs.LG] Aug. 9, 2016, 10 pages.
Gelman, "Exploratory Data Analysis for Complex Models," © 2004 American Statistical Association, Institute of Mathematical Statistics, and Interface Foundation of North America Journal of Computational and Graphical Statistics, vol. 13, No. 4, pp. 755-779 DOI: 10.1198/106186004X11435.
Wu, et al., "Data Mining with Big Data," IEEE Transactions On Knowledge and Data Engineering, vol. 26, No. 1, Jan. 2014, 11 pages.
Mell et al., The NIST Definition of Cloud Computing, Recommendations of the National Institute of Standards and Technology, NIST Special Publication 800-145, Sep. 2011, 7 pages.
Github, "Risk Assessment of GitHub Copilot", URL: https://gist.github.com/0xabad1dea/be18e11beb2e12433d93475d72016902, 0xabad1dea, Jul. 2021, pp. 1-21.
Adebayo et al., "Sanity checks for saliency maps", Proceedings of the 32nd International Conference on Neural Information Processing Systems, 2018, 30 pages.
Ahluwalia et al., "Snoring: a noise in defect prediction datasets", Proceedings of the 16th International Conference on Mining Software Repositories, 2019, pp. 63-67.
Allamania et al., "Suggesting Accurate Method and Class Names", Proceedings of the 10th Joint Meeting on Foundations of Software Engineering, Aug. 30-Sep. 4, 2015, pp. 38-49.
Allamanis et al., "Learning to Represent Programs with Graphs", ICLR, 2018, pp. 1-17.
Allamanis et al., "A Convolutional Attention Network for Extreme Summarization of Source Code", ICML, vol. 48, 2016, 11 pages.
Bader et al., "AI in Software Engineering at Facebook", IEEE Software, vol. 38, No. 4, Jul.-Aug. 2021, pp. 52-61.
Bangash et al., "On the time-based conclusion stability of cross-project defect prediction models", Empirical Software Engineering, vol. 25, No. 6, Sep. 9, 2020, 38 pages.
Bavishi et al., "Context2Name: A Deep Learning-Based Approach to Infer Natural Variable Names from Usage Contexts", URL: https://arxiv.org/pdf/1809.05193.pdf, Aug. 31, 2018, pp. 1-13.
Zhou et al., "Learning Deep Features for Discriminative Localization", IEEE Conference on Computer Vision and Pattern Recognition (CVPR), 2016, pp. 1-10.
Bennaceur et al., "Machine Learning for Software Analysis: Models, Methods, and Applications", Lecture Notes in Computer Science, vol. 11026, 2018, pp. 3-49.
Bielik et al., "Adversarial Robustness for Code", Proceedings of the 37th International Conference on Machine Learning, ICML, Virtual Event (Proceedings of Machine Learning Research, vol. 119), Jul. 13-18, 2020, 18 pages.
Brown et al., "The Care and Feeding of Wild-Caught Mutants", Proceedings of the 11th Joint Meeting on Foundations of Software Engineering, Sep. 4-8, 2017, 511-522.
Brown et al., "Language models are few-shot learners", URL: https://arxiv.org/pdf/2005.14165.pdf, 2020, pp. 1-75.
Chakraborty et al., "Bias in Machine Learning Software: Why? How? What to do?", 29th ACM Joint European Software Engineering Conference and Symposium on the Foundations of Software Engineering, ACM, Aug. 23-28, 2021, 12 pages.
Chawla et al., "SMOTE: Synthetic Minority Over-sampling Technique", Journal of Artificial Intelligence Research, vol. 16, Jun. 2002, pp. 321-357.
Ciniselli et al., "An Empirical Study on the Usage of BERT Models for Code Completion", 18th IEEE/ACM International Conference on Mining Software Repositories, MSR, May 17-19, 2021, 12 pages.
Cuoq et al., "Frama-C", International Conference on Software Engineering and Formal Methods, Springer, Oct. 2012, 16 pages.
Dam et al., "Automatic Feature Learning for Predicting Vulnerable Software Components", IEEE Transactions on Software Engineering, vol. 14, No. 8, Aug. 2015, pp. 1-19.
Dinella et al., "Hoppity: Learning graph transformations to detect and fix bugs in programs", International Conference on Learning Representations (ICLR), 2020, pp. 1-17.
Dolan-Gavitt et al., "LAVA: Large-Scale Automated Vulnerability Addition", IEEE Symposium on Security and Privacy (SP), 2016, pp. 110-121.
"Infer Static Analyzer", URL: https://fbinfer.com/, Facebook, retrieved on Oct. 28, 2021, pp. 1-5.
Garg et al., "Learning To Predict Vulnerabilities From Vulnerability-Fixes: A Machine Translation Approach", URL: https:/arxiv.org/pdf/2012.11701.pdf, 2020, 12 pages.
Github, "Your AI pair programmer", URL: https://copilot.github.com/, 2021, 12 pages.
Golagha et al., "Can We Predict the Quality of Spectrum based Fault Localization?", 13th IEEE International Conference on Software Testing, Validation and Verification, ICST, IEEE, Oct. 24-28, 2020, pp. 4-15.
Gowal et al., "On the Effectiveness of Interval Bound Propagation for Training Verifiably Robust Models", URL: https://arxiv.org/pdf/1810.12715.pdf, 2018, 16 pages.
Graves et al., "Automated Curriculum Learning for Neural Networks", Proceedings of the 34th International Conference on Machine Learning, PMLR, vol. 70, 2017, 10 pages.
Gros et al., "Code to Comment "Translation": Data, Metrics, Baselining & Evaluation", 35th IEEE/ACM International Conference on Automated Software Engineering, ASE, IEEE, Sep. 21-25, 2020, pp. 746-757.
Guo et al., "LEMNA: Explaining Deep Learning based Security Applications", Proceedings of the ACM SIGSAC Conference on Computer and Communications Security, Oct. 15-19, 2018, 16 pages.
Gupta et al., "Locating Faulty Code Using Failure-Inducing Chops", Proceedings of the 20th IEEE/ACM International Conference on Automated Software Engineering, Nov. 7-11, 2005, pp. 263-272.
Hacohen et al., "On The Power of Curriculum Learning in Training Deep Networks", Proceedings of the 36th International Conference on Machine Learning, Proceedings of Machine Learning Research, vol. 97, 2019, 13 pages.
Iyer et al., "Summarizing Source Code using a Neural Attention Model", Proceedings of the 54th Annual Meeting of the Association for Computational Linguistics, Aug. 7-12, 2016, pp. 2073-2083.
Kim et al., "Code Prediction by Feeding Trees to Transformers", 43rd IEEE/ACM International Conference on Software Engineering, ICSE, May 22-30, 2021, pp. 150-162.
Kingma et al., "Adam: A Method for Stochastic Optimization", URL: https://arxiv.org/pdf/1412.6980.pdf, 2017, pp. 1-15.

(56) References Cited

OTHER PUBLICATIONS

Laidlaw et al., "Perceptual Adversarial Robustness: Defense Against Unseen Threat Models", International Conference on Learning Representations, 2020, pp. 1-22.
Li et al., "Gated Graph Sequence Neural Networks", International Conference on Learning Representations, 2017, pp. 1-20.
Li et al., "SySeVR: A Framework for Using Deep Learning to Detect Software Vulnerabilities", URL: https://arxiv.org/pdf/1807.06756v2.pdf, 2018, pp. 1-13.
Li et al., "VulDeePecker: A Deep Learning-Based System for Vulnerability Detection", 25th Annual Network and Distributed System Security Symposium, Feb. 18-21, 2018, pp. 1-15.
Liu et al., "Multi-task Learning based Pretrained Language Model for Code Completion", 35th IEEE/ACM International Conference on Automated Software Engineering, Sep. 21-25, 2020. pp. 473-485.
Liu et al., "Learning to Spot and Refactor Inconsistent Method Names", Proceedings of the 41st International Conference on Software Engineering, May 25-31, 2019, pp. 1-12.
"Lizard", A simple code complexity analyser, URL: https://github.com/terryyin/lizard, 2012, pp. 1-9.
Lou et al., "Boosting Coverage-Based Fault Localization via Graph-Based Representation Learning", 29th ACM Joint European Software Engineering Conference and Symposium on the Foundations of Software Engineering, ACM, Aug. 23-28, 2021, pp. 664-676.
Lundberg et al., "A unified approach to interpreting model predictions", 31st Conference on Neural Information Processing Systems ,Advances in Neural Information Processing Systems, 2017, pp. 1-10.
Zhou et al., "Devign: Effective Vulnerability Identification by Learning Comprehensive Program Semantics via Graph Neural Networks", Advances in Neural Information Processing Systems (NeurIPS) 32, 2019, pp. 1-11.
Mazuera-Rozo et al., "Shallow or Deep? An Empirical Study on Detecting Vulnerabilities using Deep Learning", 29th IEEE/ACM International Conference on Program Comprehension, May 20-21, 2021, 12 pages.
"Pmccabe: McCabe style function complexity and line counting for C and C++", URL: https://people.debian.org/~bame/pmccabe, McCabe, 1992-2021, pp. 1-2.
Mirshokraie et al., "Efficient JavaScript Mutation Testing", 2013 IEEE Sixth International Conference on Software Testing, Verification and Validation, 2013, pp. 74-83.
Misherghi et al., "HDD: Hierarchical Delta Debugging", Proceedings of the 28th International Conference on Software Engineering, May 20-28, 2006, 10 pages.
Mohapatra et al., "Towards Verifying Robustness of Neural Networks against a Family of Semantic Perturbations", Proceedings of the IEEE/CVF Conference on Computer Vision and Pattern Recognition, 2020, pp. 1-12.
Nguyen et al., "Focus: A Recommender System for Mining API Function Calls and Usage Patterns", Proceedings of the 41st International Conference on Software Engineering, May 25-31, 2019, pp. 1050-1060.
International Search Report and Written Opinion received for PCT Application Serial No. PCT/CN2022/125878 dated Dec. 21, 2022, 9 pages.
Intellectual Property Office, Patents Act 1977: Examination Report under Section 18(3), Dec. 20, 2024, 3 Pages, GB Application No. 2405783.8.
Japan Patent Office, "Notice of Reasons for Refusal" Mar. 31, 2026, 07 Pages, JP Application No. 2024-519748.

* cited by examiner

SERVER 102

MODEL INTROSPECTION COMPONENT 110

COMMUNICATIONS COMPONENT 112

EXTRACTION COMPONENT 114

TESTING DATA SUBSET COMPONENT 202

DISTRIBUTION COMPONENT 302

SYSTEM BUS 118

PROCESSOR 120

MEMORY 116

COMPLEXITY DATABASE 130

CODE COMPLEXITY METRICS 128

TESTING DATA SUBSET 204

TESTING DATASETS 122

SOURCE CODE SAMPLES 126

TRAINED AI MODELS 124

NETWORK(S) 104

TESTING DATASETS 122

SOURCE CODE SAMPLES 126

TRAINED AI MODELS 124

INPUT DEVICE(S) 106

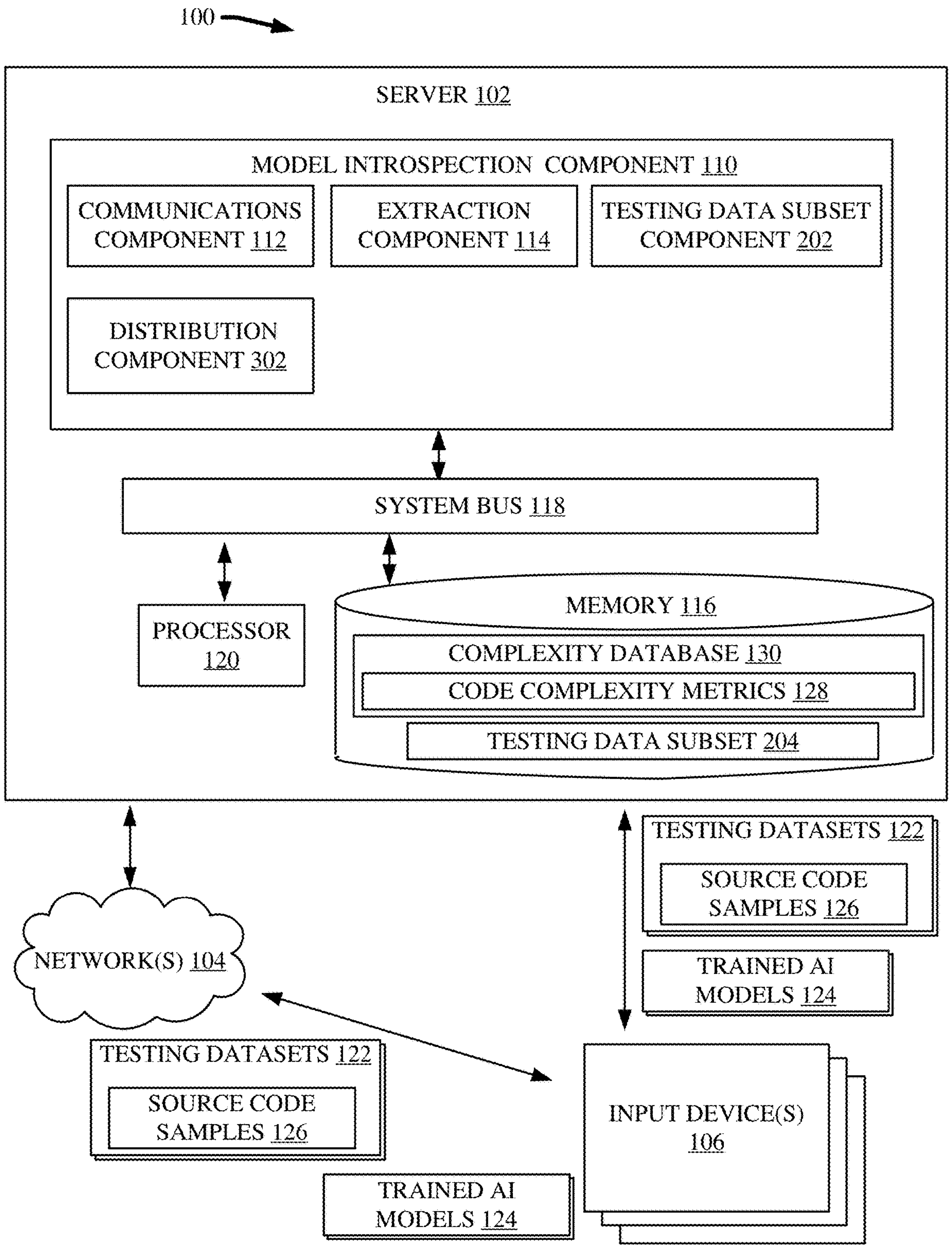

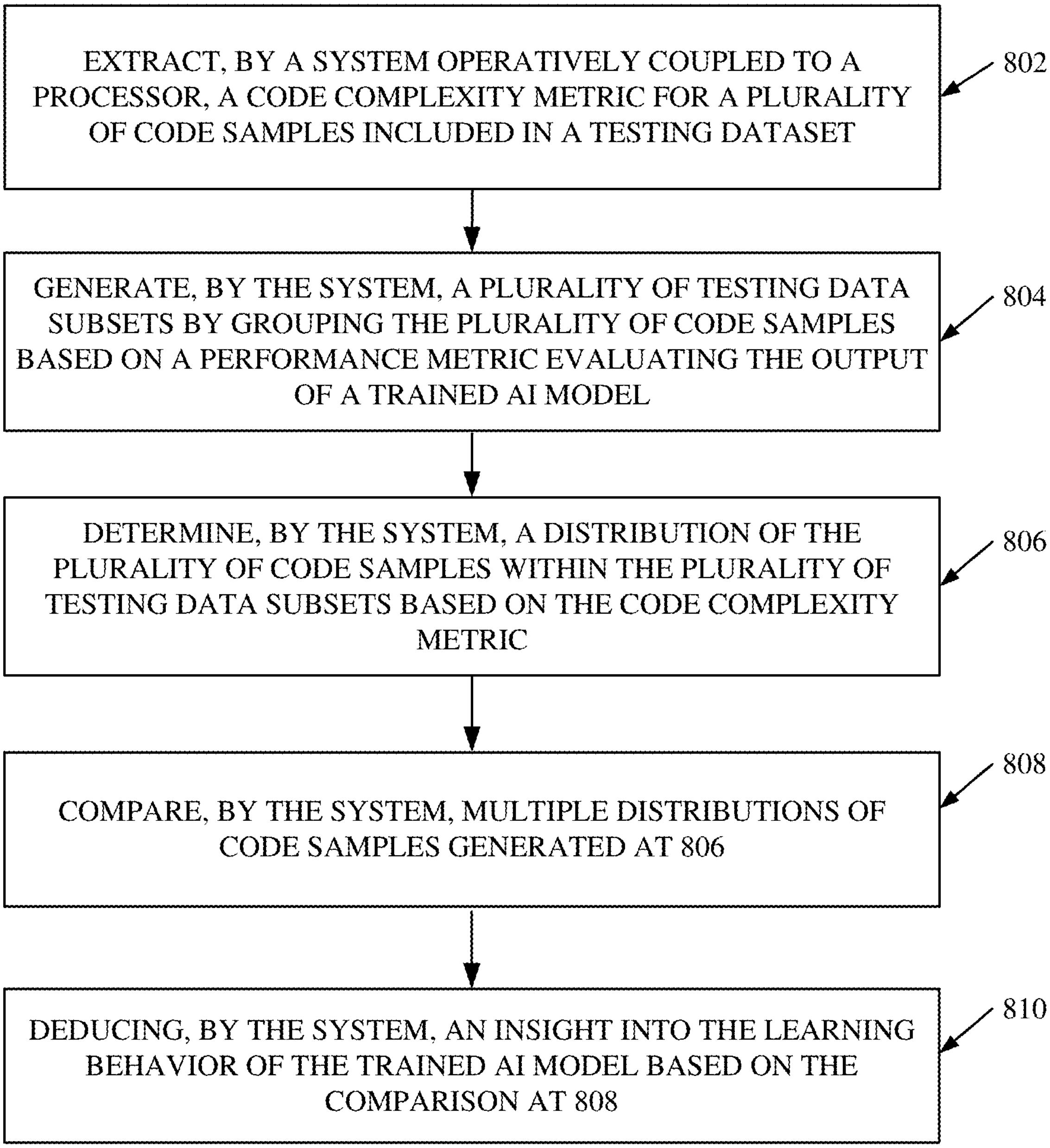

EXTRACT, BY A SYSTEM OPERATIVELY COUPLED TO A PROCESSOR, A CODE COMPLEXITY METRIC FOR A PLURALITY OF CODE SAMPLES INCLUDED IN A TESTING DATASET — 802

GENERATE, BY THE SYSTEM, A PLURALITY OF TESTING DATA SUBSETS BY GROUPING THE PLURALITY OF CODE SAMPLES BASED ON A PERFORMANCE METRIC EVALUATING THE OUTPUT OF A TRAINED AI MODEL — 804

DETERMINE, BY THE SYSTEM, A DISTRIBUTION OF THE PLURALITY OF CODE SAMPLES WITHIN THE PLURALITY OF TESTING DATA SUBSETS BASED ON THE CODE COMPLEXITY METRIC — 806

COMPARE, BY THE SYSTEM, MULTIPLE DISTRIBUTIONS OF CODE SAMPLES GENERATED AT 806 — 808

DEDUCING, BY THE SYSTEM, AN INSIGHT INTO THE LEARNING BEHAVIOR OF THE TRAINED AI MODEL BASED ON THE COMPARISON AT 808 — 810

800

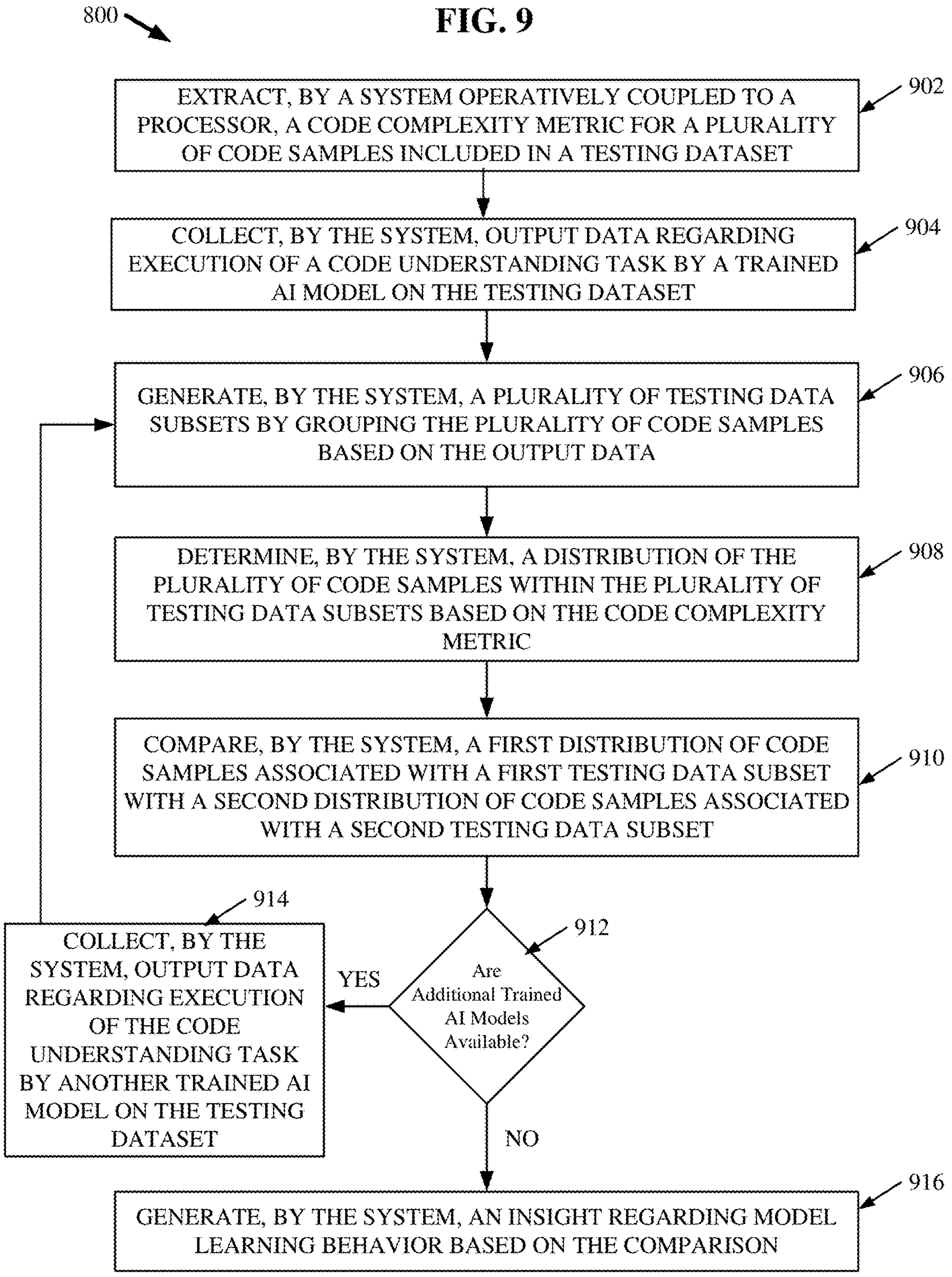

FIG. 9
EXTRACT, BY A SYSTEM OPERATIVELY COUPLED TO A PROCESSOR, A CODE COMPLEXITY METRIC FOR A PLURALITY OF CODE SAMPLES INCLUDED IN A TESTING DATASET
902
COLLECT, BY THE SYSTEM, OUTPUT DATA REGARDING EXECUTION OF A CODE UNDERSTANDING TASK BY A TRAINED AI MODEL ON THE TESTING DATASET
904
GENERATE, BY THE SYSTEM, A PLURALITY OF TESTING DATA SUBSETS BY GROUPING THE PLURALITY OF CODE SAMPLES BASED ON THE OUTPUT DATA
906
DETERMINE, BY THE SYSTEM, A DISTRIBUTION OF THE PLURALITY OF CODE SAMPLES WITHIN THE PLURALITY OF TESTING DATA SUBSETS BASED ON THE CODE COMPLEXITY METRIC
908
COMPARE, BY THE SYSTEM, A FIRST DISTRIBUTION OF CODE SAMPLES ASSOCIATED WITH A FIRST TESTING DATA SUBSET WITH A SECOND DISTRIBUTION OF CODE SAMPLES ASSOCIATED WITH A SECOND TESTING DATA SUBSET
910
914
COLLECT, BY THE SYSTEM, OUTPUT DATA REGARDING EXECUTION OF THE CODE UNDERSTANDING TASK BY ANOTHER TRAINED AI MODEL ON THE TESTING DATASET
YES
Are Additional Trained AI Models Available?
912
NO
GENERATE, BY THE SYSTEM, AN INSIGHT REGARDING MODEL LEARNING BEHAVIOR BASED ON THE COMPARISON
916

ARTIFICIAL INTELLIGENCE MODEL LEARNING INTROSPECTION

BACKGROUND

The subject disclosure relates to the introspection of an artificial intelligence model's learning behavior, and more specifically, to analyzing the learning behavior of a trained artificial intelligence ("AI") model by comparing an output of the AI model with respect to testing data having samples of varying code complexity.

AI models are employed in a variety of source code understanding tasks, such as: defect detection, code summarization, code completion, bug fixing, function and variable naming, code recommendation, software development workflows, and/or the like. However, training AI models for source code understanding tasks can face a variety of reliability concerns, including: data duplication bias, labeling quality, low robustness and/or generalization, model overfitting (e.g., due to dataset size limitations), class imbalance (e.g., due to a mismatch between sample counts belonging to different classes), and/or the like. For example, performance quality of the AI model can be affected by whether the model is learning task-relevant aspects of the source code. Further, understanding the learning behavior of an AI model can typically focus on analyzing the software architecture of the model. Thus, typical approaches can require access and/or deep subject matter knowledge of the model's internal operation. Additionally, typical introspection approaches can neglect an analysis of signal awareness in the AI model's learning behavior. Moreover, existing model performance metrics can neglect to consider aspects of the datasets on which the AI models are trained.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can deduce one or more insights regarding the learning behavior of an AI model are described.

According to an embodiment, a system is provided. The system can comprise a memory that can store computer executable components. The system can also comprise a processor, operably coupled to the memory, and that executes the computer executable components stored in the memory. The computer executable components can comprise a model introspection component that can analyze artificial intelligence model learning behavior for a code understanding task by comparing an output of an artificial intelligence model with respect to a plurality of testing data subsets that have varying code complexity distributions. An advantage of such a system can be the identification of how code complexity of the samples analyzed by the AI model can affect the performance of the AI model.

In some examples, the system can also comprise an extraction component that can extract a code complexity metric for a plurality of code samples included in a testing dataset. An advantage of such a system can be the utilization of various code complexity metrics to characterize one or more aspects of code complexity in the samples.

According to another embodiment, a system is provided. The system can comprise a memory that can store computer executable components. The system can also comprise a processor, operably coupled to the memory, and that executes the computer executable components stored in the memory. The computer executable components can comprise a model introspection component that can deduce the learning behavior of an artificial intelligence model for a code understanding task based on a performance of the artificial intelligence model on a plurality of testing data subsets having varying code complexity distributions. An advantage of such a system can be the ability to introspect the AI model via a dataset driven perspective.

In some examples, the system can also comprise a testing data subset component that can generate the plurality of testing data subsets by grouping a plurality of code samples based on a performance metric that evaluates the performance of the artificial intelligence model. An advantage of such a system can be a tailoring of AI model introspection based on one or more targeted performance metrics.

According to an embodiment, a computer-implemented method is provided. The computer-implemented method can comprise analyzing, by a system operatively coupled to a processor, an artificial intelligence model learning behavior for a code understanding task by comparing an output of an artificial intelligence model with respect to a plurality of testing data subsets that have varying code complexity distributions. An advantage of such a computer-implemented method can be analysis of whether the AI model has learned task-relevant signals during training.

In some examples, the computer-implemented method can comprise determining, by the system, a distribution of a plurality of code samples within a plurality of testing data subsets based on a code complexity metric. An advantage of such a computer-implemented method can be an analysis of sample population with respect to code complexity across multiple performance outcomes of the AI model.

According to another embodiment, a computer-implemented method is provided. The computer-implemented method can comprise deducing, by a system operatively coupled to a processor, the learning behavior of an artificial intelligence model for a code understanding task based on a performance of the artificial intelligence model on a plurality of testing data subsets having varying code complexity distributions. An advantage of such a computer-implemented method can be the development of insights regarding, for example: deciphering learned model-logic, driving model evolution, model design space evaluation, and/or dataset segmentation.

In some examples, the computer-implemented method can comprise comparing, by the system, a first distribution of code samples associated with a first testing data subset from a plurality of testing data subsets with a second distribution of code samples associated with a second testing data subset from a plurality of testing data subsets. An advantage of such a computer-implemented method can be the identification of sample aspects that can affect distributions of samples amongst testing data subsets, where each testing data subset can be associated with a defined AI model performance condition.

According to an embodiment, a computer program product for code complexity driven model introspection is provided. The computer program product can comprise a computer readable storage medium having program instructions embodied therewith. The program instructions can be executable by a processor to cause the processor to analyze, by the processor, an artificial intelligence model learning behavior for a code understanding task by comparing an output of an artificial intelligence model with respect to a plurality of testing data subsets that have varying code complexity distributions. An advantage of such a computer program product can be an introspection approach that is agnostic of AI model type and/or source code understanding task.

In some examples, the program instructions can further cause the processor to extract, by the processor, a code complexity metric for a plurality of code samples included in a testing dataset. Also, the program instructions can further cause the processor to generate, by the processor, the plurality of testing data subsets by grouping the plurality of code samples based on a performance metric that evaluates the output of the artificial intelligence model. Further, the program instructions can further cause the processor to determine, by the processor, a distribution of the plurality of code samples within the plurality of testing data subsets based on the code complexity metric. Moreover, the program instructions can further cause the processor to compare, by the processor, a first distribution of code samples associated with a first testing data subset from the plurality of testing data subsets with a second distribution of code samples associated with a second testing data subset from the plurality of testing data subsets. An advantage of such a computer program product can be the use of code complexity metrics to group samples by prediction accuracy to determine AI model learning behavior in terms of codes aspects that are readily understandable by the AI model.

BRIEF DESCRIPTION OF THE DRAWINGS

FIG. 3 illustrates a block diagram of an example, non-limiting system that can determine a distribution of source code samples within a testing data subset with respect to one or more code complexity metrics in accordance with one or more embodiments described herein.

FIG. 8 illustrates a flow diagram of an example, non-limiting computer-implemented method that can facilitate introspecting a trained AI model to analyze the learning behavior and/or training evolution of the trained AI model in accordance with one or more embodiments described herein.

FIG. 9 illustrates a flow diagram of an example, non-limiting computer-implemented method that can facilitate introspecting a trained AI model to analyze the learning behavior and/or training evolution of the trained AI model in accordance with one or more embodiments described herein.

DETAILED DESCRIPTION

Figure 1:
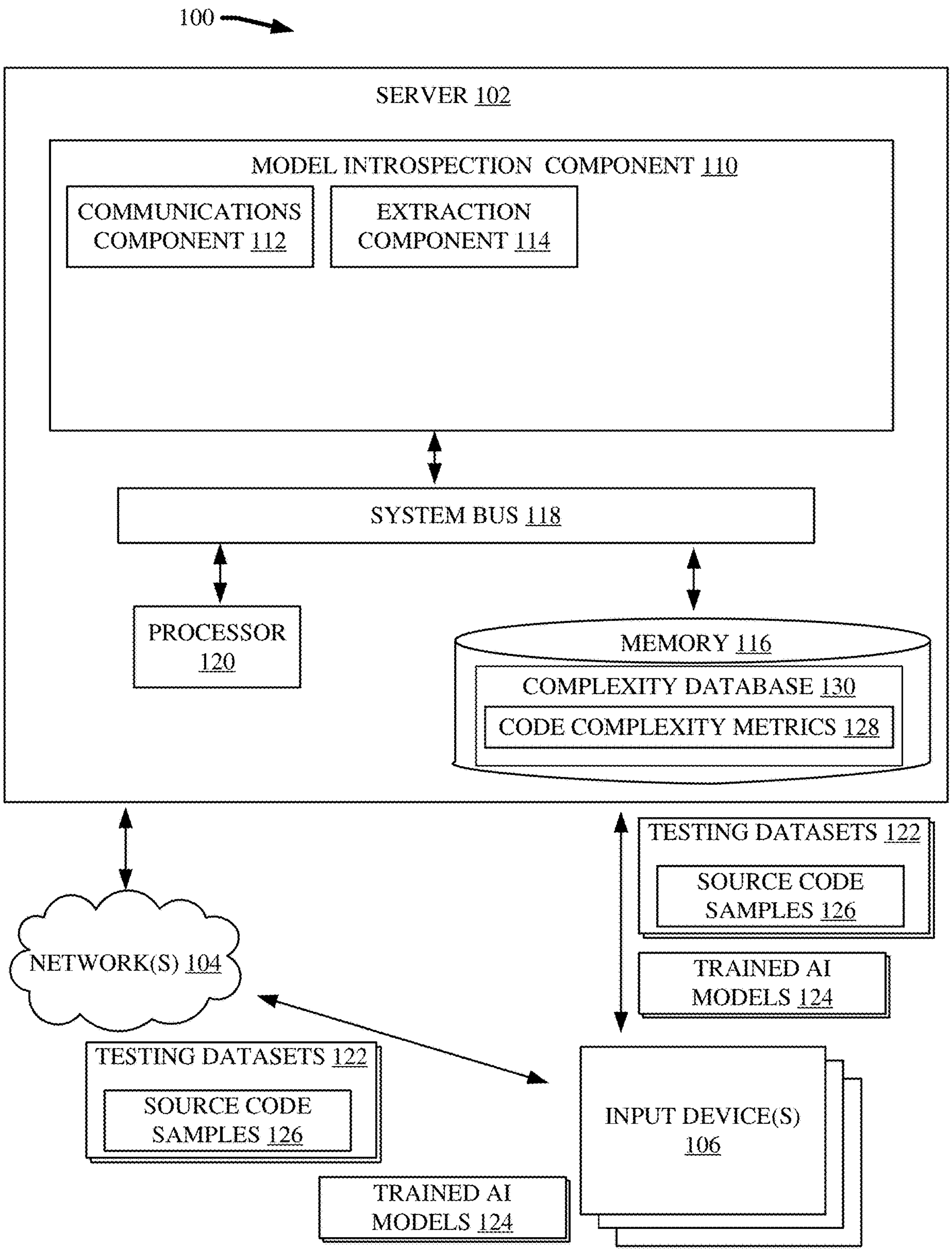
FIG. 1 illustrates a block diagram of an example, non-limiting system that can introspect the learning behavior of one or more AI models in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of trained AI model introspection; the present disclosure can be implemented to produce a solution to one or more of these problems by enabling an introspection of one or more AI model learning behaviors via code complexity based approach. Advantageously, one or more embodiments described herein can introspect trained AI model learning behavior from a dataset perspective to provide insights beyond statistical quality measurements. Additionally, the various introspective techniques described herein can be agnostic to the AI model type and/or the source understanding task.

Various embodiments of the present invention can be directed to computer processing systems, computer-implemented methods, apparatus and/or computer program products that facilitate the efficient, effective, and autonomous (e.g., without direct human guidance) introspection of one or more trained AI models. For example, one or more embodiments described herein can determine one or more insights regarding a trained AI model evolution based on one or more code metrics, such as one or more code complexity metrics. For instance, one or more embodiments can deduce learning behavior insights of the one or more trained AI models by comparing code metric distributions between testing data subsets grouped by a performance metric, such as prediction accuracy. Insights that can be determined via the various embodiments described herein can regard, for example: dataset segmentation, the deciphering of learned model logic, signal awareness of the AI model, evolution of the AI model during training, and/or evaluation of the AI model design space. For instance, one or more embodiments described herein can compare the common characteristics of testing data samples that a trained AI model predicted correctly versus the characteristics of testing data samples that the AI model predicted incorrectly to determine aspects of the source code samples that the AI model has learned well versus aspects that can be targeted for improved learning.

Various embodiments described herein are exemplified with regards to source code understanding tasks; however, the architecture is not so limited. For example, one or more embodiments described herein can introspect AI models employed to generally perform a machine learning task involving code understanding. Further, various embodiments described herein are exemplified with regards to the use of source code samples as testing data; however, the architecture is not so limited. For example, one or more embodiments described herein can employ binary code samples and/or assembly code samples as testing data in the introspection of trained AI models.

The computer processing systems, computer-implemented methods, apparatus and/or computer program products employ hardware and/or software to solve problems that are highly technical in nature (e.g., introspection of one or more AI models), that are not abstract and cannot be performed as a set of mental acts by a human. For example, an individual, or a plurality of individuals, cannot deduce insights regarding an AI model's evolution through training based on a comparison of testing data subsets comprising sample distributions of varying code complexity. Also, one or more embodiments described herein can constitute a technical improvement over conventional AI model introspection by deducing one or more insights into whether the trained AI model has learned signals that are relevant to the machine learning task to be executed. Additionally, various embodiments described herein can demonstrate a technical improvement over conventional AI model introspection by identifying how one or more training variations can affect the learning behavior of the trained AI model.

Further, one or more embodiments described herein can have a practical application by identifying one or more characteristics of training data samples that render the samples easy or difficult for one or more AI models to accurately predict. In another example, various embodiments described herein can decipher which aspects of a code sample are learned or neglected by a trained AI model. Additionally, one or more embodiments described herein can have a practical application by targeting one or more sample characteristics (e.g., code aspects) that can be common to mispredictions by one or more AI models. One or more embodiments described herein can control a plurality of hyperparameter tuning iterations to trace AI model understanding improvements and/or derive one or more of the example insights described herein.

FIG. 1 illustrates a block diagram of an example, non-limiting system 100 that can analyze the learning behavior of one or more trained AI models 124. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, and/or one or more input devices 106. The server 102 can comprise model introspection component 110. The model introspection component 110 can further comprise communications component 112 and/or extraction component 114. Also, the server 102 can comprise or otherwise be associated with at least one memory 116. The server 102 can further comprise a system bus 118 that can couple to various components such as, but not limited to, the model introspection component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the model introspection component 110 can be provided on the one or more servers 102, it should be appreciated that the architecture of system 100 is not so limited. For example, the model introspection component 110, or one or more components of model introspection component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more testing datasets 122 and/or trained AI models 124 into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, in one or more embodiments the one or more input devices 106 can be employed to enter one or more testing datasets 122 into the system 100, which can be stored in the one or more memories 116. Further, the model introspection component 110 can utilize the one or more testing datasets 122 to determine one or more insights regarding the leaning behavior of one or more trained AI models 124 (e.g., for one or more code understanding tasks). In one or more embodiments, the one or more testing datasets 122 can comprise one or more code samples, such as source code samples 126. Additionally, the one or more testing datasets 122 can comprise other types of code samples, such as binary code samples and/or assembly code samples. Further, the one or more samples of the testing dataset 122 (e.g., source code samples 126) can include, for example: samples augmented from an original code dataset, ranked samples, randomized samples, a combination thereof, and/or the like.

In one or more embodiments, the one or more input devices 106 can also be employed to enter one or more trained AI models 124 into the system 100, which can be stored in the one or more memories 116 and/or analyzed by the model introspection component 110. Further, in various embodiments, the one or more input devices 106 can be employed to define one or more settings and/or parameters of the trained AI model 124 introspection. For example, the one or more input devices 106 can be employed to define one or more code complexity metrics in accordance with one or more embodiments described herein. In various embodiments, the communications component 112 can share one or more inputs (e.g., entered into the system 100 via the one or more input devices 106) with the associate components of the model introspection component 110 in accordance with one or more embodiments described herein.

In various embodiments, the one or more trained AI models 124 can be used to facilitate one or more machine learning tasks (e.g., code understanding tasks, such as source code understanding tasks). In one or more embodiments, the trained AI models 124 can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). The trained AI models 124 can learn through one or more training schemes, wherein data with known outcomes is inputted into the computer model, outputs regarding the data are compared to the known outcomes, and/or the weights of the computer model are autonomous adjusted based on the comparison to replicate the known outcomes. As the models train, the computer model can become increasingly accurate; thus, trained AI models 124 can accurately analyze data with unknown outcomes, based on lessons learning from training data, to facilitate one or more machine learning tasks. Example trained AI models 124 can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM"). Further, various embodiments described herein are applicable to classical machine learning models.

In one or more embodiments, the model introspection component 110 can deduce one or more insights regarding the learning behavior of the one or more trained AI models 124 by employing the one or more testing datasets 122 to compare code characteristics with respect to one or more performance metrics (e.g., across correctly and incorrectly predicted source code samples 126). Example metrics that can characterize the one or more code characteristics can include code complexity metrics 128. As referred to herein, the term "code complexity" can refer to the complexity inherent to a given computer application source code. Code complexity can affect the efficiency of computer software. For example, as code complexity increases, the probability of the source code sample comprising a defect can also increase. Further, code complexity can be characterized and/or quantified via one or more code complexity metrics 128.

In various embodiments, the extraction component 114 can extract one or more code complexity metrics 128 from the one or more training datasets 122 (e.g., from the source code samples 126) of the one or more testing datasets 122. In one or more embodiments, the code complexity can be measured in terms of cyclomatic complexity and/or Halstead complexity via the one or more code complexity metrics 128, and/or a function of multiple code complexity metrics 128. For example, the one or more code complexity metrics 128 can be a measure of, but are not limited to: a cyclomatic complexity metric, source lines of code ("SLOC") (e.g., lines of source code and/or executable code), Halstead volume, maintainability index, coupling/depth of inheritance, cognitive complexity, rework ratio, program volume, a program difficulty calculation (e.g., the difficulty to write or understand the source code), an effort calculation (e.g., a measure of coding time), a program length measure, a program vocabulary measure, number of classes, number of comment lines, density of comment lines, number of directories, number of files, number of functions, number of projects in a view, number of statements, a combination thereof, and/or the like. In one or more embodiments, the one or more code complexity metrics 128 can be a function of one or more semantic artifacts included in the one or more testing data samples (e.g., source code samples 126). Example artifacts can include, but are not limited to: decision points, if-conditions, iterative loops, number of linearly independent paths, number of commits modifying the given source code, number of developers contributing to the given source code, number of conversations associated with the given source code, a combination thereof, and/or the like. For instance, code complexity can be calculated based on the number of paths through a source code sample 126. Where the control flow of a function splits, the code complexity can increase (e.g., a complexity counter can increase incrementally with each split).

In various embodiments, the extraction component 114 can analyze each sample (e.g., source code sample 126) comprised in the one or more testing datasets 122 and extract one or more code complexity metrics 128 from the samples (e.g., source code samples 126) to determine the code complexity of the samples (e.g., source code samples 126). For example, the extraction component 114 can extract one type of code complexity metric 128 from each of the source code samples 126 to characterize the code complexity of the source code samples 126. In another example, the extraction component 114 can extract multiple types of code complexity metrics 128 from each source code samples 126 (e.g., extract two or more code complexity metrics 128 per source code sample 126) to characterize the code complexity of the source code samples 126. In various embodiments, the extraction component 114 can characterize the code complexity of a source code samples 126 as a function of multiple code complexity metrics 128 extracted from the source code samples 126.

The extraction method employed by the extraction component 114 to extract the one or more code complexity metrics 128 can vary depending on the code complexity metric 128 being extracted. For example, the extraction component 114 can employ Frama-C to extract one or more code complexity metrics 128. For instance, one or more code complexity metrics 128 can be extracted by counting one or more relevant artifacts of the source code sample 126 (e.g., counting the lines of code). In another instance, the extraction component 114 can employ one or more analyzer tools to extract the one or more code complexity metrics 128, including, but not limited to: a cyclomatic complexity analyzer (e.g., Lizard analyzer tool), a McCabe complexity analyzer (e.g., mccabe analyzer tool), pycodequal analyzer tool, xenon analyzer tool, cyclocomp analyzer tool, saikuro analyzer tool, cmetrics analyzer, cscout analyzer tool, a combination thereof, and/or the like.

In one or more embodiments, the extraction component 114 can store the one or more extracted code complexity metrics 128 in the one or more memories 116 along with an identification of the associate source code sample 126 in one or more complexity databases 130. For example, the one or more complexity databases 130 can comprise one or more charts, tables, logs, and/or the like that lists the analyzed source code samples 126 and the extract code complexity metrics 128 associated with each analyzed source code sample 126.

Figure 2:
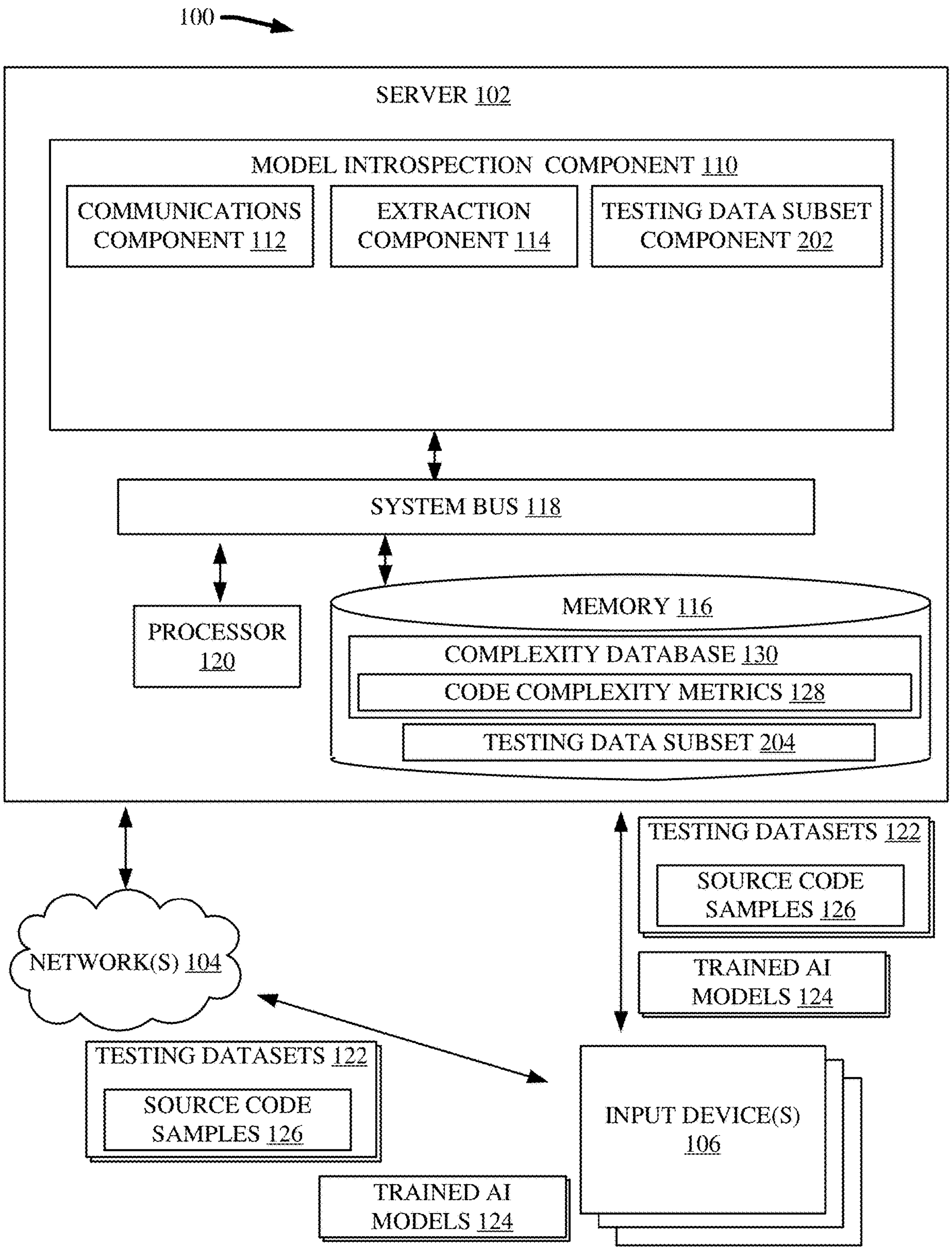
FIG. 2 illustrates block diagram of an example, non-limiting system that can generate one or more testing datasets comprising varying code complexity in accordance with one or more embodiments described herein.

FIG. 2 illustrates a diagram of the example, non-limiting system 100 further comprising testing data subset component 202 in accordance with one or more embodiments described herein. Repetitive description of like elements employed in other embodiments described herein is omitted for the sake of brevity. In one or more embodiments, the model introspection component 110 can execute one or more source code understanding tasks (e.g., defined via the one or more input devices 106) on the one or more trained AI models 124. Thereby, the one or more trained AI models 124 can generate one or more outputs (e.g., predictions) in completing the source code understanding task. In one or more embodiments, the trained AI model 124 outputs can be entered into the system 100 via the one or more input devices 106.

In various embodiments, the testing data subset component 202 can analyze the one or more outputs of the trained AI models 124 with regards to one or more performance metrics, such as accuracy, precision, recall, and/or the like. For example, the testing data subset component 202 can determine the accuracy of one or more predictions generated by the trained AI models 124 in executing the defined source code understanding task on the one or more testing datasets 122. For instance, the correct outputs (e.g., predictions) associated with each source code sample 126 can be known to the testing data subset component 202 (e.g., can be entered into the system 100 via the one or more input devices 106), where the testing data subset component 202 can compare the known correct outputs to the trained AI model 124 output to test the accuracy of the trained AI models 124.

Further, the testing data subset component 202 can group the testing samples (e.g., one or more source code samples 126) into one or more testing data subsets 204 based on the performance of the one or more trained AI models 124 (e.g., based on accuracy, precision, recall, signal-awareness recall, a combination thereof, and/or the like). For instance, the testing data subset component 202 can group the one or more source code samples 126 to generate one or more testing data subsets 204 that can be stored in the one or more memories 116. Example testing data subsets 204 generated when evaluating trained AI model 124 performance with regards to accuracy can include, but are not limited to: a true positive ("TP") subset, a false negative ("FN") subset, true negative ("TN"), false positive ("FP"), a combination thereof, and/or the like. For instance, the testing data subset component 202 can group those source code samples 126 correctly analyzed as positive by the one or more trained AI models 124 into a TP testing data subset 204. Also, the testing data subset component 202 can group those source code samples 126 incorrectly analyzed as negative by the one or more trained AI models 124 into a FN testing data subset 204. In various embodiments, the testing data subset component 202 can group the testing samples (e.g., source code samples 126) into two, three, or more testing data subsets 204. In one or more embodiments, the performance metric utilized by the testing data subset component 202 to evaluate the one or more trained AI models 124 can be defined via the one or more input devices 106 and/or can be based on the source code understanding task. Also, in one or more embodiments, the number and/or type of testing data subsets 204 used by the testing data subset component 202 to group the source code samples 126 can be defined via the one or more input devices 106 and/or can be based on the source code understanding task.

FIG. 3 illustrates a diagram of the example, non-limiting system 100 further comprising distribution component 302 in accordance with one or more embodiments described herein. Repetitive description of like elements employed in other embodiments described herein is omitted for the sake of brevity. In one or more embodiments, the distribution component 302 can determine a distribution of the testing samples (e.g., source code samples 126) comprised within a testing data subset 204 with respect to one or more of the extracted code complexity metrics 128.

For example, the distribution component 302 can identify the extracted code complexity metrics 128 associated with each of the source code samples 126 comprised within the testing data subsets 204. For instance, the distribution component 302 can determine how many (e.g., as a percent of the total population of the testing datasets 122 and/or of the population of the testing data subset 204) source code samples 126 within a given testing data subset 204 have a given code complexity metric 128 value. In another instance, the distribution component 302 can determine the value range of a code complexity metric 128 that characterizes the source code samples 126 of a given testing data subset 204. In a further instance, the distribution component 302 can determine how frequently the conditions of the given testing data subset 204 are met with a source code sample 126 having a given code complexity metric 128 value.

In one or more embodiments, the distribution component 302 can generate one or more displays to represent the source code sample 126 distributions. For instance, the one or more displays can include, but are not limited to, one or more: graphs, charts, tables, texts, images, videos, a combination thereof, and/or the like. Further, the distribution component 302 can share the one or more displays with the one or more input devices 106 (e.g., via the one or more networks 104).

Figure 4:
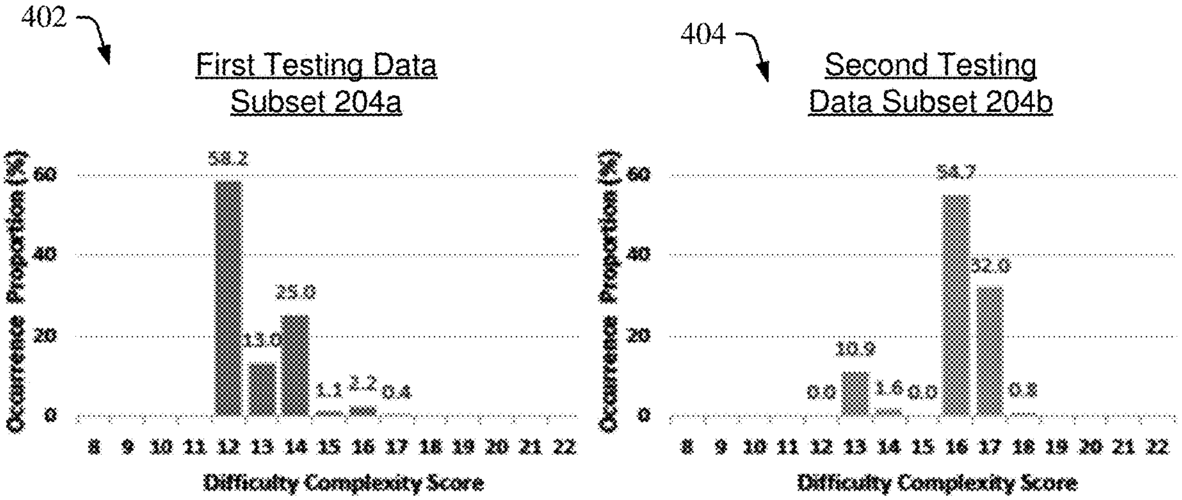
FIG. 4 illustrates a diagram of an example, non-limiting graph that can demonstrate one or more relations between code complexity in testing data and the accuracy of AI model predictions in accordance with one or more embodiments described herein.

FIG. 4 illustrates a diagram of example, non-limiting graphs 402 and/or 404 that can be generated by the distribution component 302 to represent the distribution of code complexity within the source code samples 126 of each of the testing data subsets 204 generated by the testing data subset component 202. Repetitive description of like elements employed in other embodiments described herein is omitted for the sake of brevity. FIG. 4 depicts one or more bar graphs to represent the distribution of source code samples 126 with respect to one or more code complexity metrics 128; however, the architecture of the model introspection component 110 is not so limited. For example, the bar graph format depicted in FIG. 4 is exemplary, and the distribution component 302 can represent the code complexity metric 128 distributions via a variety of display formats.

To demonstrate the efficacy of the various embodiments described herein, the system 100 was employed with regards to a vulnerability detection use-case on a plurality of datasets; however, the various embodiments are applicable to other source code understanding tasks. Example testing datasets 122 employed to demonstrate the efficacy of the system 100 include the s-bAbI synthetic dataset ("s-bAbI"). While the s-bAbI testing dataset 122 can be employed to demonstrate the efficacy of the various embodiments described herein; the features of the model introspection component 110 are not limited to the example s-bAbI testing dataset 122, rather other source code datasets can be analyzed. The s-bAbI testing dataset 122 contains syntactically valid C programs with non-trivial control flow, focusing on the buffer overflow vulnerability. For the purpose of vulnerability detection task, the s-bAbI generator can be used to create a dataset, where samples with the "UNSAFE" tag can be labelled 1 and samples with the "SAFE" tag can be labelled 0. Further, in one or more embodiments a trained graph neural network ("GNN") AI model 124 can be employed to demonstrate the efficacy of the system 100. However, the various features of the model introspection component 110 are not limited to the trained GNN AI model 124 types.

Graphs 402 and/or 404 regard the distribution of the source code samples 126 across two testing data subsets 204 generated from the execution of a trained GNN AI model 124 on the s-bAbI testing dataset 122. For example, source code samples 126 that result in a TP output from the trained AI model 124 can be grouped into a first testing data subset 204*a*. Also, source code samples 126 that result in a FN output from the trained AI model 124 can be grouped into the second testing data subset 204*b*. Graph 402 shows the distribution of source code samples 126 in the first testing data subset 204*a* with regards to one or more of the code complexity metrics 128. Graph 404 shows the distribution of the source code samples 126 in the second testing data subset 204*b* with regards to the same one or more code complexity metrics 128. For instance, graph 402 depicts that 58.2 percent of the TP occurrences achieved by the trained AI model 124 are associated with source code samples 126 determined to have a difficult code complexity metric 128 value of 12. In another instance, graph 404 depicts that 54.7 percent of FN occurrences achieved by the trained AI model 124 are associated with source code samples 126 determined to have a difficulty code complexity metric 128 of value 16.

Figure 5:
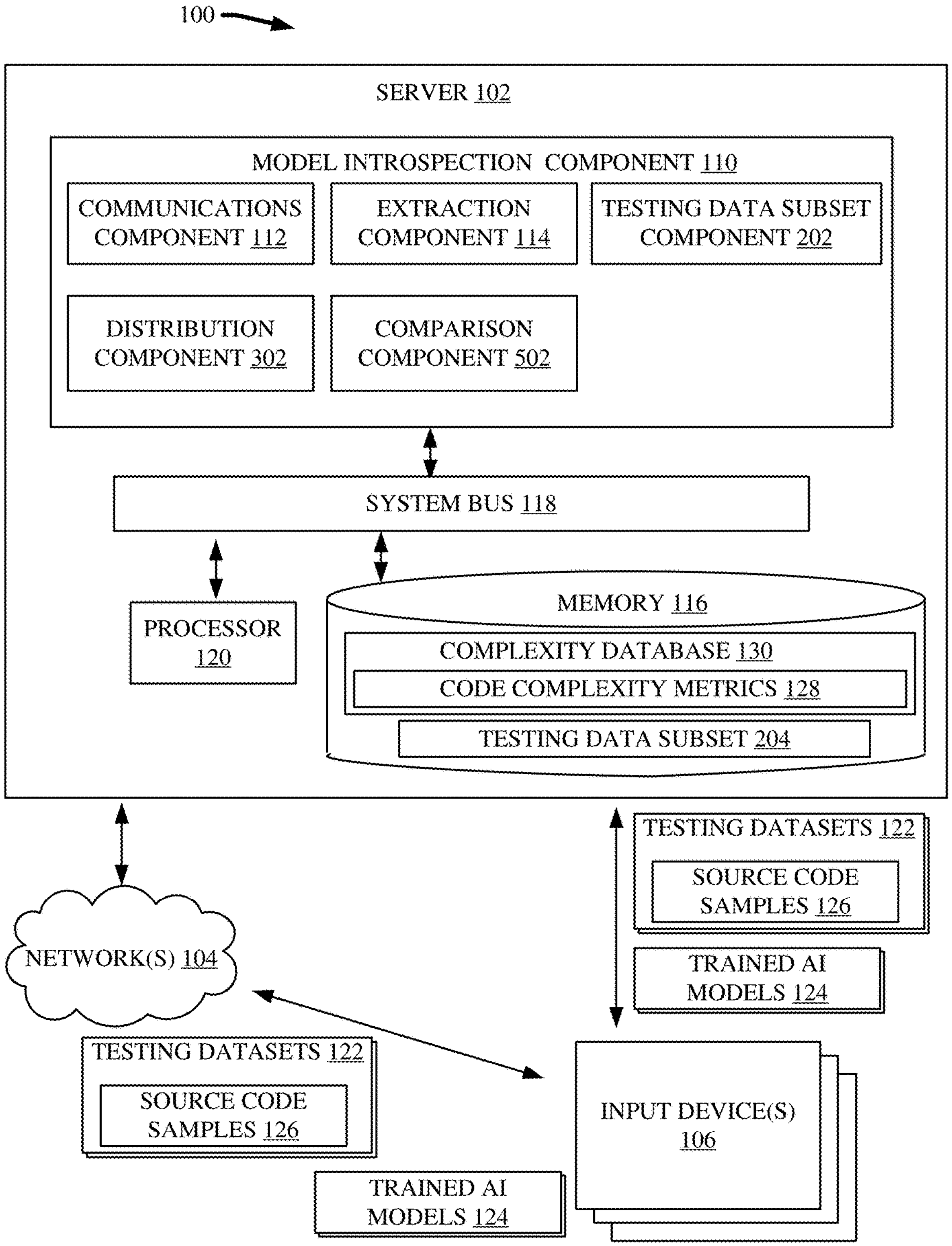
FIG. 5 illustrates a block diagram of an example, non-limiting system that can compare and/or contrast testing data subsets having comprising source code sample distributions with varying amounts and/or types of code complexity in accordance with one or more embodiments described herein.

FIG. 5 illustrates a diagram of the example, non-limiting system 100 further comprising comparison component 502 in accordance with one or more embodiments described herein. Repetitive description of like elements employed in other embodiments described herein is omitted for the sake of brevity. In various embodiments, the comparison component 502 can compare and/or contrast the testing sample (e.g., source code sample 126) distributions generated by the distribution component 302 across multiple testing data subsets 204.

In one or more embodiments, the comparison component 502 can compare the source code sample 126 distribution of one testing data subset 204 to the source code sample 126 distribution of one or more other testing data subsets 204 to facilitate the identification of one or more similarities and/or differences between the distributions. For example, the comparison component 502 can compare the source code sample 126 distribution of the first testing data subset 204*a* represented in graph 402 with the source code sample 126 distribution of the second testing data subset 204*b* represented in graph 404. For instance, the comparison component 502 can compare the code complexity metric 128 value range associated with the source code sample 126 distribution across testing data subsets 204. In another instance, the comparison component 502 can compare the population of source code samples 126 having a defined code complexity metric 128 across testing data subsets 204. In a further instance, the comparison component 502 can compare the source code sample 126 populations across testing data subsets 204. In one or more embodiments, the comparing and/or contrasting performed by the comparison component 502 can be in accordance with one or more parameters and/or objectives defined by the one the one or more input devices 106.

In various embodiments, the model introspection component 110 can generate one or more insights regarding the learning behavior and/or training evolution of the one or more trained AI models 124 based on the comparing and/or contrasting performed by the comparison component 502. For example, with regards to the exemplary source code sample 126 distributions depicted in FIG. 4, the comparison component 502 can compare the value range of the code complexity metric 128 embodied by the distributions to determine that the vast majority of source code samples 126 included in the first testing data subset 204*a* (e.g., TP results) have a code complexity metric 128 value of less than or equal to 14, and the vast majority of source code samples 126 included in the second testing data subset 204*b* (e.g., FN results) have a code complexity metric 128 value of greater than or equal to 16. Based on this comparison, the model introspection component 110 can determine the insight that the accuracy of the trained AI model 124 can depend on the code complexity of the source code samples 126; where the trained AI model 124 can make accurate predictions with regards to source code samples 126 having a code complexity metric 128 value of 14 or less, but can be markedly less accurate with regards to source code samples 126 having a code complexity metric 128 value of 16 or higher.

Thus, the evaluation metric used to sort the source code samples 126 into the testing data subsets 204 combined with the source code sample 126 distributions of the testing data subsets 204 can inform one or more determination made by the model introspection component 110. In one or more embodiments, the model introspection component 110 can analyze the testing data subset 204 distributions (e.g., generated by the distribution component 302) and/or comparisons (e.g., generated by the comparison component 502) to determine a multitude of insights regarding, for example: dataset segmentation and introspection, decipher learned model logic, signal awareness derivations, code-centric model evolution, design space evaluation from a dataset perspective, code-centric model comparisons, a combination thereof, and/or the like.

For example, where the testing data subsets 204 are generated based on accuracy of the trained AI model 124 output, the model introspection component 110 can determine which source code samples 126 are easier or more difficult for the trained AI model 124 to predict based on the population of the testing data subsets 204. Further, the model introspection component 110 can identify one or more characteristics that can render the source code samples 126 easier or harder to predict based on the source code sample 126 distributions within each testing data subset 204. For instance, the introspection component 110 can identify one or more commonalities between the source code sample 126 distributions based on the comparisons performed by the comparison component 502.

In another example, the model introspection component 110 can determine whether the signals learned by the trained AI model 124 are relevant to the given machine learning task, or whether the signals learned by the trained AI model 124 comprise noise and/or dataset bias. For instance, the model introspection component 110 can determine that a trained AI model 124 learned on signals that are not relevant to the given task based on: low source code sample 126 populations in testing data subsets 204 associated with accurate results, and/or testing data subsets 204 associated with inaccurate results comprising source code samples 126 with greater code complexity. In a further example, the model introspection component 110 can identify code characteristics common to mispredictions by the trained AI model 124.

In a still further example, the trained AI model 124 can be analyzed across multiple iterations of the trained AI model 124 execution with varying hyperparameter settings. Thereby, the model introspection component 110 can analyze source code sample 126 distribution across testing data subsets 204 and execution iterations to trace model understanding in association with the hyperparameter settings. In an additional example, the trained AI model 124 can be analyzed by the model introspection component 110 across multiple testing datasets 122, each comprising a respective manipulation and/or augmentation to the source code sample 126 composition. Additionally, the trained AI model 124 can be analyzed by the model introspection component 110 across multiple testing datasets 122, where the order in which source code samples 126 are introduced to the trained AI model 124 various. In a still further example, the model introspection component 110 can analyze multiple trained AI models 124 with regards to the same testing dataset 122, where each trained AI model 124 can be trained in a different manner. Thereby, the model introspection component 110 can analyze source code sample 126 distribution across testing data subsets 204, testing datasets 122, various model settings, and/or various model training schemes to: trace model improvement techniques such as data augmentation, curriculum learning, active learning, adversarial training, a combination thereof, and/or the like; and/or assess task-suitability across models.

Figure 6:
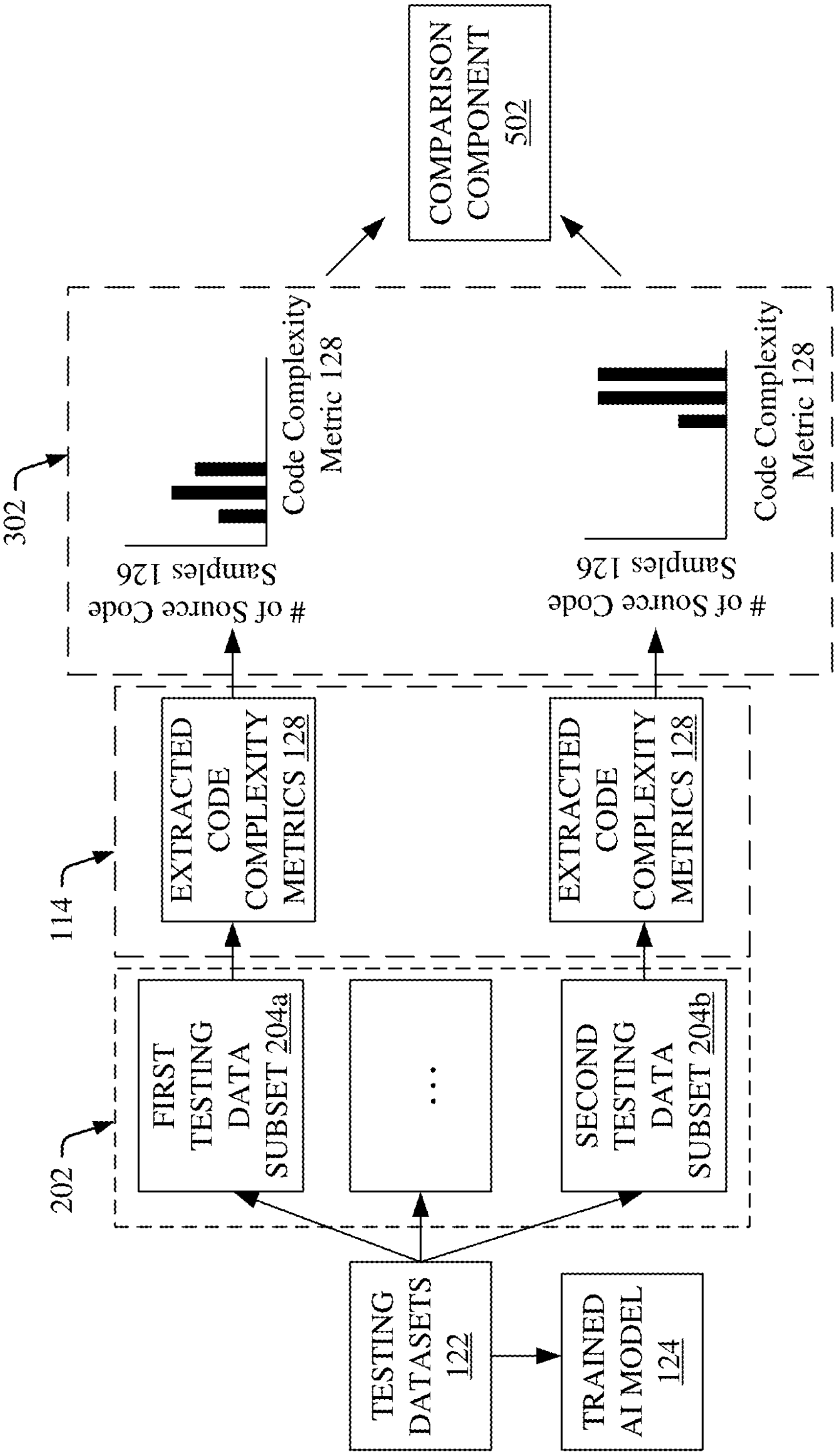
FIG. 6 illustrates a diagram of an example, non-limiting introspection scheme that can be implemented to deduce one or more insights regarding the learning behavior of one or more trained AI models in accordance with one or more embodiments described herein.

FIG. 6 illustrates a diagram of an example, non-limiting introspection scheme 600 that can be implemented by the model introspection component 110 in accordance with one or more embodiments described herein. Repetitive description of like elements employed in other embodiments described herein is omitted for the sake of brevity. FIG. 6 depicts an exemplary introspection scheme 600; however, the architecture of the system 100 is not limited to the order of events or number of features depicted in FIG. 6. For example, one or more features of the introspection scheme 600 can be practiced in an alternative order (e.g., code complexity metrics 128 can be extracted from the source code samples 126 before or after generation of the testing data subsets 204). In another example, while two testing data subsets 204 are expressly shown in FIG. 6, additional testing data subsets 204 can be generated (e.g., as indicated by the " . . . " in FIG. 6).

As shown in FIG. 6, the one or more trained AI models 124 can utilize the one or more testing datasets 122 to execute one or more machine learning tasks (e.g., source code understanding tasks). In accordance with various embodiments, execution of the trained AI models 124 can be performed by the model introspection component 110 and/or can be performed independently, where the results of the execution can be supplied to the model introspection component 110 via the one or more input devices 106. Based on the output of the one or more trained AI models 124, the testing data subset component 202 can group the source code samples 126 of the testing datasets 122 into a plurality of testing data subsets 204 based on one or more conditions associated with each testing data subset 204. For example, a condition associated with the first testing data subset **204*a* can be that the first testing data subset 204 comprises source code samples 126 associated with a TP result from the one or more trained AI models 124. In another example, a condition associated with the second testing data subset 204*b* can be that the second testing data subset 204 comprises source code samples 126 associated with a FN result from the one or more trained AI models 124. In one or more embodiments, the conditions associated with the plurality of testing data subsets 204 can be predefined and/or defined by the testing data subset component 202 based on the given task performed by the one or more trained AI models 124. In one or more embodiments, the one or more conditions associated with the plurality of testing data subsets 204 can be defined via the one or more input devices 106**.

Further, the extraction component 114 can extract one or more code complexity metrics 128 from each of the source code samples 126 comprised in the plurality of testing data subsets 204. Thereby, the distribution component 302 can determine one or more distributions of the source code samples 126 within the testing data subsets 204 with respect to one or more of the extracted code complexity metrics 128. In accordance with various embodiments described herein, the distribution component 302 can generate one or more displays, such as graphs (e.g., as exemplified in FIG. 4), to represent the source code sample 126 distributions. Additionally, the comparison component 502 can compare and/or contrast the source code sample 126 distributions across the plurality of testing data subsets 204. In accordance with various embodiments described herein, the model introspection component 110 can determine one or more insights regarding the learning behavior of the one or more trained AI models 124 based on the one or more comparisons generated by the comparison component 502.

Figure 7:
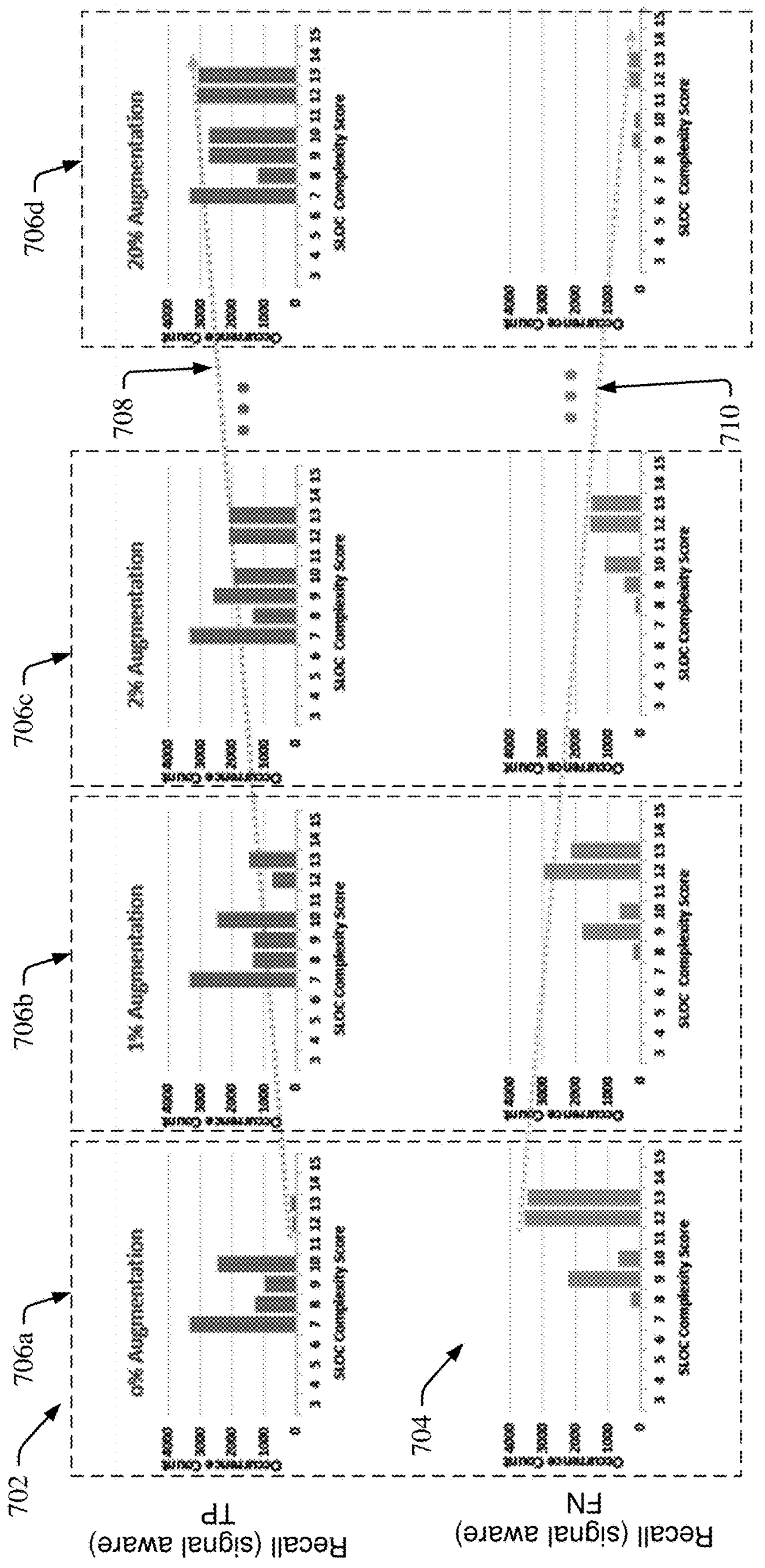
FIG. 7 illustrates a diagram of example, non-limiting graph chains that can demonstrate how a system, computer-implemented method, and/or computer program product can deduce one or more insights regarding a trained AI model's learning behavior from a plurality of testing data subsets in accordance with one or more embodiments described herein.

FIG. 7 illustrates a diagram of example, non-limiting graph chains 702, 704 that can depict one or more insights that can be determined by the model introspection component 110 by employing multiple iterations of the example introspection scheme 600 in accordance with one or more embodiments described herein. Repetitive description of like elements employed in other embodiments described herein is omitted for the sake of brevity. In one or more embodiments, the model introspection component 110 can perform multiple iterations of the introspection scheme 600 across varying parameter settings, trained AI models 124, and/or testing datasets 122. For example, FIG. 7 depicts one or more comparisons and/or insights that can be generated by the model introspection component 110 when performing multiple iteration of the example introspection scheme 600 across multiple trained AI models 124, each trained on training datasets with varying amounts of augmentation.

For example, the model introspection component 110 can deduce learning behavior of the trained AI models 124 by comparing the source code sample 126 distributions of the testing data subsets 204 (e.g., defined based on prediction accuracy) with respect to code complexity across multiple trained AI models 124 having the same architecture and/or settings but trained on datasets with varying amounts of augmentation, as compared to a base dataset. As shown in FIG. 7, in a first introspection iteration 706*a*, the model introspection component 110 can analyze a trained AI model 124 trained on a base dataset (e.g., comprising 0% augmentation). Subsequently, the model introspection component 110 can perform multiple iterations of the introspection scheme 600. For example, the model introspection component 110 can perform the second introspection iteration 706*b*, third introspection iteration 706*c*, and/or fourth introspection iteration 706*d* with regards to trained AI models 124 trained on datasets comprising 1% augmentation, 2% augmentation, and 20% augmentations, respectively. While FIG. 7 illustrates four iterations of the introspection scheme 600, the architecture of the system 100 is not so limited. For example, the model introspection component 110 can perform more or less than four iterations.

For each introspection iteration 706 of the introspection scheme 600 (e.g., first introspection iteration 706*a*, second introspection iteration 706*b*, third introspection iteration 706*c*, and/or fourth introspection iteration 706*d*), the model introspection component 110 can analyze the trained AI models 124 with respect to a first testing data subset 204*a* comprising source code samples 126 based on recall (signal awareness) TP results (e.g., as represented in graph chain 702). Additionally, for each introspection iteration 706 of the introspection scheme 600 (e.g., first introspection iteration 706*a*, second introspection iteration 706*b*, third introspection iteration 706*c*, and/or fourth introspection iteration 706*d*), the model introspection component 110 can analyze the trained AI models 124 with respect to a second testing data subset 204*b* comprising source code samples 126 based on recall (signal awareness) FN results (e.g., as represented in graph chain 704).

The signal-aware recall metric can be used to demonstrate improved model performance. The signal aware recall metric can be used to measure the signal awareness of an AI-for-code model. For instance, in the context of a vulnerability detection task, while a recall measurement can measure the proportion of vulnerable samples which the model predicts correctly, the signal-aware recall metric can measure for how many of those cases does the model capture the correct signals to arrive at the prediction. For example, in the context of vulnerability detection, the signal-aware recall metric can measure the proportion of vulnerable samples which the trained AI model 124 predicts correctly (e.g., using task-relevant signals).

Further, the model introspection component 110 can analyze the distribution of source code samples 126 within the testing data subsets 204 with respect the SLOC code complexity metric 128. However, the architecture of the model introspection component 110 is not limited to the exemplary testing data subsets 204 and/or code complexity metrics 128 shown in FIG. 7. For example, the model introspection component 110 can perform the example introspection scheme 600 with regards to other testing data subsets 204 (e.g., based on evaluation metrics other than accuracy) and/or other code complexity metrics 128.

Based on the multiple introspection iterations, the model introspection component 110 can determine that the trained AI model 124 trained on the base dataset can face the most trouble in understanding larger source code samples 126 (e.g., source code samples 126 having a larger SLOC value). However, the model introspection component 110 can determine that the given augmentation scheme can be effective at improving the learning behavior of the architecture and/or settings of the trained AI models 124. For instance, as shown in a comparison between dotted lines 708 and 710, as the amount of augmentation used to train the trained AI model 124 architecture and/or settings increases, the number of large (e.g., as defined by the SLOC code complexity metric 128) source code samples 126 correctly predicted by the trained AI model 124 increases and the number of large (e.g., as defined by the SLOC code complexity metric 128) source code samples 126 mis-predicted by the trained AI model 124 decreases. By identifying the trend represented by dotted lines 708 and/or 710 across the multiple introspection iterations 706, the model introspection component 110 can determine the insight that the augmentation scheme tested amongst the multiple copies of the trained AI model 124 architecture and/or settings can result in improved model understanding of large (e.g., as defined by SLOC) source code samples 126.

FIG. 8 illustrates a diagram of an example, non-limiting computer-implemented method 800 that can facilitate introspection of one or more trained AI models 124 in accordance with one or more embodiments described herein. Repetitive description of like elements employed in other embodiments described herein is omitted for the sake of brevity.

At 802, the computer-implemented method 800 can comprise extracting (e.g., via extraction component 114), by a system 100 operatively coupled to a processor 120, one or more code complexity metrics 128 for a plurality of code samples (e.g., source code samples 126) included in one or more testing datasets 122. In accordance with various embodiments described herein, the code complexity metrics 128 can characterize the code complexity of the plurality of code samples (e.g., source code samples 126) and/or can be stored in one or more memories 116 for subsequent analysis by the system 100.

At 804, the computer-implemented method 800 can comprise generating (e.g., via testing data subset component 202), by the system 100, a plurality of testing data subsets 204 by grouping the plurality of code samples (e.g., source code samples 126) based on one or more performance metrics (e.g., an accuracy metric) evaluating the output of a trained AI model 124. For example, the trained AI model 124 can complete one or more source code understanding tasks using the one or more testing datasets 122, where the grouping at 804 can be based on the performance of the trained AI model 124 in executing the task. In one or more embodiments, execution of the task can be performed via the system 100, and/or the trained AI model 124 can be independently operated and the resulting output and/or performance metrics can be shared with the system 100 (e.g., via one or more networks 104 and/or input devices 106). At 806, the computer-implemented method 800 can comprise determining (e.g., via distribution component 302), by the system 100, a distribution of the plurality of code samples (e.g., source code samples 126) within the plurality of testing data subsets 204 based on the code complexity metric 128 extracted at 802. For instance, FIGS. 4 and/or 6-7 depict example source code sample 126 distributions that can be generated at 806.

At 808, the computer-implemented method 800 can comprise comparing (e.g., via comparison component 502), by the system 100, multiple distributions of code samples (e.g., source code samples 126) generated at 806. For example, the comparing at 808 can be between a distributions associated with: different testing data subsets 204, different iterations of the computer-implemented method 800 (e.g., different introspection iterations 706), different trained AI models 124, and/or different testing datasets 122. At 810, the computer-implemented method 800 can comprise deducing (e.g., via model introspection component 110), by the system 100, one or more insights into the learning behavior of the one or more trained AI models 124 based on the comparison at 810.

FIG. 9 illustrates a flow diagram of an example, non-limiting computer-implemented method 900 that can facilitate an introspection of one or more trained AI models 124 from a dataset perspective in accordance with one or more embodiments described herein. Repetitive description of like elements employed in other embodiments described herein is omitted for the sake of brevity.

At 902, the computer-implemented method 900 can comprise extracting (e.g., via extraction component 114), by a system 100 operatively coupled to a processor 120, one or more code complexity metrics 128 for a plurality of code samples (e.g., source code samples 126) included in one or more testing datasets 122. In accordance with various embodiments described herein, the code complexity metrics 128 can characterize the code complexity of the plurality of code samples (e.g., source code samples 126) and/or can be stored in one or more memories 116 for subsequent analysis by the system 100.

At 904, the computer-implemented method 900 can comprise collecting (e.g., via model introspection component 110 and/or communications component 112), by the system, output data regarding execution of one or more code understanding tasks by a trained AI model 124 on the one or more testing datasets 122. In one or more embodiments, execution of the task can be performed via the system 100, and/or the trained AI model 124 can be independently operated and the resulting output and/or performance metrics can be shared with the system 100 (e.g., via one or more networks 104 and/or input devices 106). At 906, the computer-implemented method 900 can comprise generating (e.g., via testing data subset component 202), by the system 100, a plurality of testing data subsets 204 by grouping the plurality of code samples (e.g., source code samples 126) based on the output data collected at 904. For example, the grouping at 906 can be based on the performance of the trained AI model 124 in executing the task.

At 908, the computer-implemented method 900 can comprise determining (e.g., via distribution component 302), by the system 100, a distribution of the plurality of code samples (e.g., source code samples 126) within the plurality of testing data subsets 204 based on the code complexity metric 128 extracted at 902. For instance, FIGS. 4 and/or 6-7 depict example source code sample 126 distributions that can be generated at 906. At 910, the computer-implemented method 900 can comprise comparing (e.g., via comparison component 502), by the system 100, a first distribution of code samples (e.g., source code samples 126) associated with a first testing data subset 204*a* with a second distribution of code samples (e.g., source code samples 126) associated with a second testing data subset 204*b*.

At 912, the computer-implemented method 900 can comprise determining (e.g. via model introspection component 110), by the system 100, whether additional trained AI models 124 are available for introspection. Where additional trained AI models 124 are available, the computer-implemented method 900 can proceed to 914. Where additional trained AI models 124 are not available, the computer-implemented method 900 can proceed to 916. At 914, the computer-implemented method 900 can comprise collecting (e.g., via model introspection component 110 and/or communications component 112), by the system 100, output data regarding execution of the code understanding task by another trained AI model 124 on the one or more testing datasets 122. Subsequently, the computer-implemented method 900 can proceed to 906. Thereby, the computer-implemented method 900 can perform multiple introspection iterations 706 with regards to multiple trained AI models 124, which can each comprise one or more structural variations, training variations, and/or setting variations (e.g., as exemplified in FIG. 7). At 916, the computer-implemented method 900 can comprise generating (e.g., via model introspection component 110), by the system 100, one or more insights regarding model learning based on at least the comparisons made at 910. For instance, the generating at 916 can comprise identifying one or more characteristics of code sample (e.g., source code sample 126) distributions between testing data subsets 204 and/or trends between introspection iterations 706.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
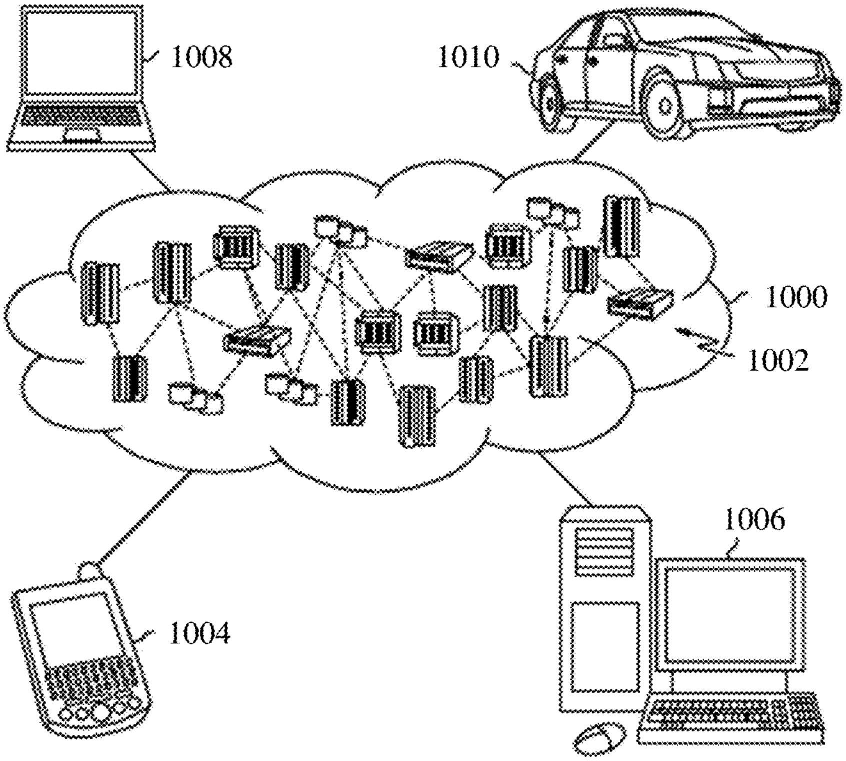
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
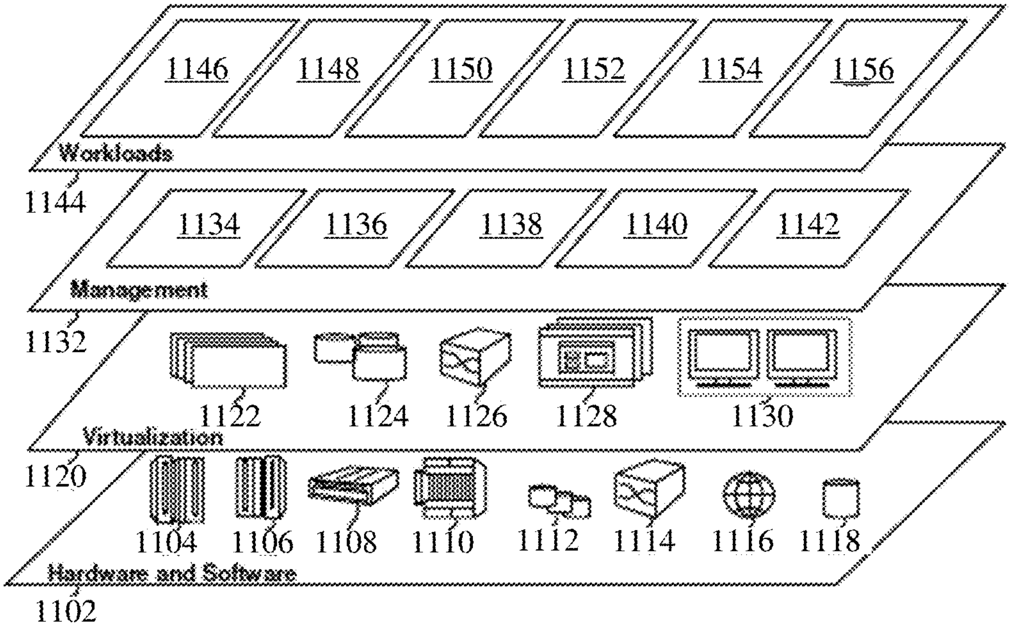
FIG. 11 depicts abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for the sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and AI model introspection 1156. Various embodiments of the present invention can utilize the cloud computing environment described with reference to FIGS. 10 and 11 to introspect one or more trained AI models 124 and/or deduce insights regarding the learning behavior of the one or more trained AI models 124 in accordance with one or more embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
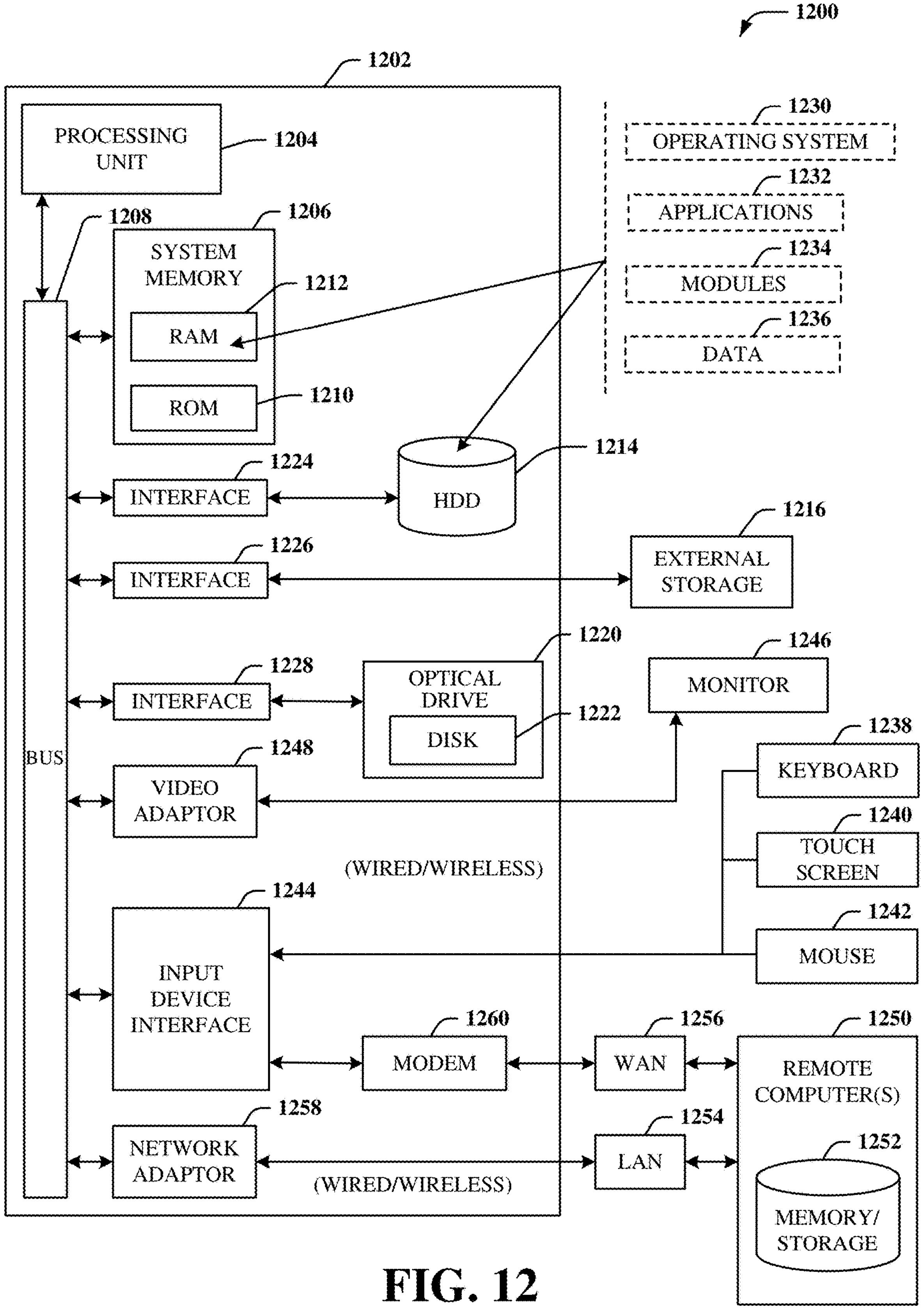
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, a combination thereof, and/or the like) and an optical disk drive 1220 (e.g., which can read or write from a CD-ROM disc, a DVD, a BD, and/or the like). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, and/or the like.

A monitor 1246 or other type of display device can be also connected to the system bus 1208 via an interface, such as a video adapter 1248. In addition to the monitor 1246, a computer typically includes other peripheral output devices (not shown), such as speakers, printers, a combination thereof, and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer executable components; and a processor, operably coupled to the memory, and that executes the computer executable components stored in the memory, wherein the computer executable components comprise:

a model introspection component that analyzes artificial intelligence model learning behavior for a code understanding task;

an extraction component that extracts one or more code complexity metrics for a plurality of source code samples included in a testing dataset;

a testing data subset component that generates a first testing data subset and a second testing data subset by grouping the plurality of source code samples based on a performance metric that evaluates prediction correctness of the artificial intelligence model, wherein the first testing data subset comprises source code samples associated with a true positive result of the artificial intelligence model, and wherein the second testing data subset comprises source code samples associated with a false negative result of the artificial intelligence model;

a distribution component that determines, based on the one or more code complexity metrics, a first distribution of the source code samples within the first testing data subset and a second distribution of the source code samples within the second testing data subset; and a comparison component that compares the first distribution with the second distribution, wherein the model introspection component determines, based on the comparison, aspects of the source code samples that the artificial intelligence model has learned and aspects of the source code samples associated with prediction errors, and generates machine-readable guidance data and causes retraining of the artificial intelligence model based on the identified aspects such that the retrained artificial intelligence model reduces prediction errors associated with the identified aspects of the source code samples.

2. The system of claim 1, wherein the performance metric comprises prediction correctness of the artificial intelligence model, and wherein the testing data subset component is configured to group the plurality of source code samples into testing data subsets based on whether corresponding predictions of the artificial intelligence model are correct or incorrect.

3. The system of claim 1, wherein the distribution component determines a distribution of the plurality of source code samples within a plurality of testing data subsets based on the one or more code complexity metrics.

4. The system of claim 3, further comprising:

a comparison component that compares a first distribution of source code samples associated with a first testing data subset from the plurality of testing data subsets with a second distribution of source code samples associated with a second testing data subset from the plurality of testing data subsets;

wherein the testing data subset component groups the plurality of source code samples based on quantitative performance metrics derived from artificial intelligence model predictions utilizing prediction confidence scores and error classification;

wherein the extraction component extracts a plurality of code complexity metrics from the source code samples, including at least one of: cyclomatic complexity, Halstead complexity, maintainability index, or control flow complexity; and wherein the comparison component generates a statistical distribution model of the extracted code complexity metrics across the testing data subsets and identifies outlier patterns and complexity thresholds that affect artificial intelligence model prediction accuracy.

5. A system, comprising:

a memory that stores computer executable components; and a processor, operably coupled to the memory, and that executes the computer executable components stored in the memory, wherein the computer executable components comprise:

a model introspection component that deduces learning behavior of an artificial intelligence model for a code understanding task by:

extracting one or more code complexity metrics from a plurality of source code samples included in a testing dataset;

programmatically generating a plurality of testing data subsets by grouping the plurality of source code samples based on a performance metric that evaluates prediction outputs of the artificial intelligence model;

executing the artificial intelligence model on each of the testing data subsets to obtain per-subset prediction outputs;

partitioning the testing data subsets into (i) subsets associated with correct predictions and (ii) subsets associated with incorrect predictions based on the per-subset prediction outputs;

determining, based on the one or more code complexity metrics, distributions of the source code samples within the subsets associated with correct predictions and the subsets associated with incorrect predictions;

computing comparative differences between the distributions;

identifying, based on the comparative distributions, complexity thresholds and structural code features correlated with prediction errors of the artificial intelligence model; and generating machine-readable guidance data that specifies modifications to training data or model parameters, and automatically retraining the artificial intelligence model using the identified complexity thresholds and structural code features such that the retrained artificial intelligence model is configured to reduce or eliminate prediction errors for source code samples exhibiting the identified characteristics.

6. The system of claim 5, wherein the performance metric comprises prediction correctness of the artificial intelligence model, and wherein the testing data subsets comprise (i) subsets associated with correct predictions and (ii) subsets associated with incorrect predictions based on the per-subset prediction outputs.

7. The system of claim 5, wherein a distribution component determines a distribution of the plurality of source code samples within the plurality of testing data subsets based on the one or more code complexity metrics.

8. The system of claim 7, further comprising:

a comparison component that compares a first distribution of source code samples associated with a first testing data subset from the plurality of testing data subsets with a second distribution of source code samples associated with a second testing data subset from the plurality of testing data subsets.

9. A computer-implemented method, comprising:

extracting, by a processor, one or more code complexity metrics from a plurality of source code samples included in a testing dataset;

generating, by the processor, a plurality of testing data subsets by grouping the plurality of source code samples based on a performance metric that evaluates prediction outputs of an artificial intelligence model;

executing, by the processor, the artificial intelligence model on each of the testing data subsets to obtain per-subset prediction outputs;

partitioning, by the processor, the testing data subsets into (i) subsets associated with correct predictions and (ii) subsets associated with incorrect predictions based on the per-subset prediction outputs;

determining, by the processor and based on the one or more code complexity metrics, distributions of the source code samples within the subsets associated with correct predictions and the subsets associated with incorrect predictions;

computing, by the processor, comparative differences between the distributions;

identifying, by the processor and based on the comparative differences, complexity thresholds and structural code features correlated with prediction errors of the artificial intelligence model; and generating, by the processor, machine-readable guidance data that specifies modifications to training data or model parameters, and retraining, by the processor, the artificial intelligence model based on the identified complexity thresholds and structural code features such that the retrained artificial intelligence model reduces prediction errors associated with the identified characteristics.

10. The computer-implemented method of claim 9, wherein the performance metric comprises prediction correctness of the artificial intelligence model, and wherein generating the plurality of testing data subsets comprises grouping the plurality of source code samples into (i) subsets associated with correct predictions and (ii) subsets associated with incorrect predictions based on the per-subset prediction outputs.

11. The computer-implemented method of claim 9, further comprising determining, by the processor, a distribution of the plurality of source code samples within the plurality of testing data subsets based on the one or more code complexity metrics.

12. The computer-implemented method of claim 11, further comprising:

comparing, by the processor, a first distribution of source code samples associated with a first testing data subset from the plurality of testing data subsets with a second distribution of source code samples associated with a second testing data subset from the plurality of testing data subsets.

13. A computer-implemented method, comprising:

extracting, by a processor, one or more code complexity metrics from a plurality of source code samples included in a testing dataset;

generating, by the processor, a plurality of testing data subsets by grouping the plurality of source code samples based on a performance metric that evaluates prediction outputs of an artificial intelligence model;

executing, by the processor, the artificial intelligence model on each of the testing data subsets to obtain per-subset prediction outputs;

partitioning, by the processor, the testing data subsets into (i) subsets associated with correct predictions and (ii) subsets associated with incorrect predictions based on the per-subset prediction outputs;

analyzing, by the processor, performance differences between the testing data subsets by determining, based on the one or more code complexity metrics, distributions of the source code samples within the subsets associated with correct predictions and the subsets associated with incorrect predictions and computing comparative differences between the distributions;

deducing, by the processor and from the comparative differences, aspects of learning behavior of the artificial intelligence model, including identification of complexity thresholds and structural code features correlated with systematic prediction errors; and generating, by the processor, machine-readable guidance data specifying modifications to training data or model parameters, and retraining, by the processor, the artificial intelligence model based on the identified complexity thresholds and structural code features such that the retrained artificial intelligence model reduces prediction errors associated with the identified characteristics.

14. The computer-implemented method of claim 13, wherein the performance metric comprises prediction correctness of the artificial intelligence model, and wherein generating the plurality of testing data subsets comprises grouping the plurality of source code samples into (i) subsets associated with correct predictions and (ii) subsets associated with incorrect predictions based on the per-subset prediction outputs.

15. The computer-implemented method of claim 13, further comprising determining, by the processor, a distribution of the plurality of source code samples within the plurality of testing data subsets based on the one or more code complexity metrics.

16. The computer-implemented method of claim 15, further comprising:

comparing, by the processor, a first distribution of source code samples associated with a first testing data subset from the plurality of testing data subsets with a second distribution of source code samples associated with a second testing data subset from the plurality of testing data subsets.

17. A computer program product for code complexity driven model introspection, the computer program product comprising a computer readable storage medium having program instructions embodied therewith, the program instructions executable by a processor to cause the processor to:

extract one or more code complexity metrics from a plurality of source code samples included in a testing dataset;

generate a plurality of testing data subsets by grouping the plurality of source code samples based on a performance metric that evaluates prediction outputs of an artificial intelligence model;

execute the artificial intelligence model on each of the testing data subsets to obtain per-subset prediction outputs;

partition the testing data subsets into (i) subsets associated with correct predictions and (ii) subsets associated with incorrect predictions based on the per-subset prediction outputs;

determine, based on the one or more code complexity metrics, distributions of the source code samples within the subsets associated with correct predictions and the subsets associated with incorrect predictions;

compute comparative differences between the distributions;

identify, based on the comparative differences, complexity thresholds and structural code features correlated with prediction errors of the artificial intelligence model; and generate machine-readable guidance data specifying modifications to training data or model parameters, and retrain the artificial intelligence model based on the identified complexity thresholds and structural code features such that the retrained artificial intelligence model reduces prediction errors associated with the identified characteristics.

18. The computer program product of claim 17, wherein the performance metric comprises prediction correctness of the artificial intelligence model, and wherein generating the plurality of testing data subsets comprises grouping the plurality of source code samples into (i) subsets associated with correct predictions and (ii) subsets associated with incorrect predictions based on the per-subset prediction outputs.

19. The computer program product of claim 17, wherein the program instructions further cause the processor to:

determine, by the processor, a distribution of the plurality of source code samples within the plurality of testing data subsets based on the one or more code complexity metrics.

20. The computer program product of claim 19, wherein the program instructions further cause the processor to:

compare, by the processor, a first distribution of source code samples associated with a first testing data subset from the plurality of testing data subsets with a second distribution of source code samples associated with a second testing data subset from the plurality of testing data subsets.

* * * * *